(12) United States Patent
Taira et al.

(10) Patent No.: US 8,504,248 B2
(45) Date of Patent: Aug. 6, 2013

(54) VEHICLE AND ITS CONTROL METHOD

(75) Inventors: Tetsuya Taira, Toyota (JP); Kiyoshi Matsumoto, Bunkyo-ku (JP); Akihito Nakai, Bunkyo-ku (JP); Yoshiyuki Ohmura, Bunkyo-ku (JP); Nobuyasu Tomokuni, Bunkyo-ku (JP); Kohei Okabe, Bunkyo-ku (JP); Christian Ott, Munich (DE); Tomoyuki Takahata, Bunkyo-ku (JP)

(73) Assignees: Toyota Jidosha Kabushiki Kaisha, Toyota-shi, Aichi (JP); The University of Tokyo, Tokyo (JP)

( * ) Notice: Subject to any disclaimer, the term of this patent is extended or adjusted under 35 U.S.C. 154(b) by 193 days.

(21) Appl. No.: 13/063,310

(22) PCT Filed: Jul. 2, 2009

(86) PCT No.: PCT/JP2009/003076
§ 371 (c)(1),
(2), (4) Date: Mar. 10, 2011

(87) PCT Pub. No.: WO2010/029669
PCT Pub. Date: Mar. 18, 2010

(65) Prior Publication Data
US 2011/0172886 A1 Jul. 14, 2011

(30) Foreign Application Priority Data
Sep. 11, 2008 (JP) ................................. 2008-233592
Sep. 12, 2008 (JP) ................................. 2008-234560

(51) Int. Cl.
*G06F 7/00* (2006.01)

(52) U.S. Cl.
USPC ............................................................ 701/49

(58) Field of Classification Search
USPC ............................................................ 701/49
See application file for complete search history.

(56) References Cited

FOREIGN PATENT DOCUMENTS

| JP | 07-136957 A | | 5/1995 |
|---|---|---|---|
| JP | 10-023613 A | | 1/1998 |
| JP | 11-198075 A | | 7/1999 |
| JP | 2003-508285 A | | 3/2003 |
| JP | 2004-500271 A | | 1/2004 |
| JP | 2004-129435 A | | 4/2004 |
| JP | 2004-276727 A | | 10/2004 |
| JP | 2006-211899 A | | 8/2006 |
| JP | 2006-282160 A | | 10/2006 |
| JP | 2007-106265 A | | 4/2007 |
| WO | WO 96/23478 | * | 8/1996 |
| WO | 2007/129505 A1 | | 11/2007 |

* cited by examiner

*Primary Examiner* — Thomas Tarcza
*Assistant Examiner* — Maceeh Anwari
(74) *Attorney, Agent, or Firm* — Kenyon & Kenyon LLP

(57) ABSTRACT

To provide a vehicle having high operability and its control method. A vehicle includes a passenger seat on which a passenger rides on, a chassis that support the passenger seat, wheels that move the chassis, a force sensor that outputs a measurement signal according to a force exerted on a seat surface of the passenger seat, a drive unit that drives the passenger seat so as to change an angle of the seat surface of the passenger seat, and a control calculation unit that calculates a reference input used to drive the wheels and the drive unit based on a drive amount of the drive unit, a balanced position posture of the passenger seat, and the measurement signal from the force sensor.

16 Claims, 24 Drawing Sheets

VEHICLE AND ITS CONTROL METHOD

This is a 371 national phase application of PCT/JP2009/003076 filed 2 Jul. 2009, claiming priority to Japanese Patent Applications No. JP 2008-233592 filed 11 Sep. 2008, and JP 2008-234560 filed 12 Sep. 2008, respectively, the contents of which are incorporated herein by reference.

TECHNICAL FIELD

The present invention relates to a vehicle and its control method.

BACKGROUND ART

In recent years, the development of a vehicle that moves with a passenger riding thereon has been in progress (Patent literatures 1 and 2). For example, in Patent literatures 1 to 3, a force sensor (pressure sensor) is provided on a riding surface (seat surface) on which a passenger rides. Then, the wheels are driven based on the output from the force sensor. That is, the force sensor serves as operation means for performing an inputting operation.

In the vehicle disclosed in Patent literature 1, the vehicle moves by shifting the body weight toward the direction the passenger wants to move. For example, when the passenger wants to move forward, the passenger inclines his/her upper body forward. That is, the passenger takes a forward-inclined posture. Then, by taking the forward-inclined posture, the force exerted on the passenger seat is changed. Then, the force sensor detects this force. The spherical tire is driven based on the detection result of the force sensor. As shown in FIG. 14 of Patent literature 1, inverted pendulum control is performed while the passenger is sitting on the passenger seat. Patent literature 2 discloses a wheelchair-type vehicle. This vehicle is equipped with a chair and a footrest.

Further, Patent literature 3 discloses a vehicle that actively detects the motion of the user and autonomously moves according to the detected motion. For example, it calculates the center of gravity of the user by using a plurality of pressure sensors. The wheelchair-shaped vehicle moves according to the detected position of the center of gravity (FIG. 2).

Further, Patent literature 4 discloses an interface apparatus that is used to operate a bipedal-walking-type vehicle. This interface apparatus has a chair-like shape. Further, a plurality of force sensors is provided on the backrest surface and the seat surface. The interface apparatus detects the rotation of the passenger's pelvis by using four force sensors to estimate the walking intention. Then, it drives both legs according to the walking intention estimated by the force sensors. Further, this interface apparatus is equipped with a footrest.

CITATION LIST

Patent Literature

Japanese Unexamined Patent Application Publication No. 2006-282160
Japanese Unexamined Patent Application Publication No. 10-23613
Japanese Unexamined Patent Application Publication No. 11-198075
Japanese Unexamined Patent Application Publication No. 7-136957

SUMMARY OF INVENTION

Technical Problem

In Patent literatures 1 to 3, the vehicle moves based on the posture of the passenger riding on the vehicle. In this way, it is possible to perform an operation according to the environment in which the vehicle can travel. For example, the passenger can operate the vehicle in the following manner. When the passenger wants to move forward, the passenger moves his/her upper body forward. That is, the passenger takes a forward-inclined posture. As a result, the position of the center of gravity shifts forward and the force exerted on the force sensor is thereby changed. In this way, the sensor detects a forward-movement input. On the contrary, when the passenger wants to move backward, the passenger takes a backward-inclined posture. As a result, the position of the center of gravity shifts backward and a backward-inclination input is detected. Further, when the passenger wants to move to the left or right, the passenger shifts the center of gravity to the left or right. As a result, a left or right turn input is detected. In this way, the vehicle can travel according to the turning input, forward-movement input, and backward-movement input.

However, in the case of vehicles in which the force sensor is disposed on the riding surface on which a passenger rides, there is the following problem. For example, assume that the vehicle is moving to a forward-right direction. In such a situation, if the vehicle has a fixed mechanical configuration, the passenger is subjected to a centrifugal force. As a result, the passenger inclines his/her posture excessively to the forward-right direction and the vehicle is thereby accelerated. Alternatively, there is a problem that the upper body is swerved to the outer side, and therefore the passenger cannot move the vehicle to the forward-right direction according to his/her intention. That is, since the actual input to the force sensor is not conveyed to the passenger, the passenger can hardly know how much operation he/she has made by intuition. In particular, when a centrifugal force is exerted, it is very difficult to operate the vehicle to the direction to which the passenger wants to move.

As described above, there is the problem in the conventional vehicles that it is impossible to operate the vehicle as the passenger intended.

An object of the present invention is to provide a vehicle having high operability and its control method.

Solution to Problem

A vehicle in accordance with a first aspect of the present invention includes: a passenger seat on which a passenger rides on; a main body that support the passenger seat; a traveling mechanism that moves the main body; a sensor that outputs a measurement signal according to a force exerted on a seat surface of the passenger seat; a passenger-seat drive mechanism that drives the passenger seat so as to change an angle of the seat surface of the passenger seat; and a control calculation unit that calculates a reference input used to drive the traveling mechanism and the passenger-seat drive mechanism based on a drive amount of the passenger-seat drive mechanism, a balanced position posture of the passenger seat, and the measurement signal from the sensor. In this way, the passenger can easily grasp the operation amount, thus improving the operability.

A vehicle in accordance with a second aspect of the present invention is the above-described vehicle, further including a posture sensing unit that outputs a signal according to a posture angle of the vehicle, wherein the balanced position posture of the passenger seat is changed according to an output of the posture sensing unit. In this way, the vehicle can move with a proper operation amount.

A vehicle in accordance with a third aspect of the present invention is the above-described vehicle, wherein the balance position posture of the passenger seat is changed so that a riding surface of the passenger seat becomes horizontal. In this way, the riding quality can be improved.

A vehicle in accordance with a fourth aspect of the present invention is the above-described vehicle, wherein the balance position posture of the passenger seat is unchanged irrespective of a traveling state of the vehicle. In this way, the operability can be easily improved.

A vehicle in accordance with a fifth aspect of the present invention is the above-described vehicle, wherein a target drive amount of the passenger-seat drive mechanism is calculated based on the drive amount of the passenger-seat drive mechanism, the balanced position posture of the passenger seat, and the measurement signal from the sensor, and a forward/backward movement speed of the vehicle is calculated based on the target drive amount of the passenger-seat drive mechanism. In this way, the vehicle can move at a proper speed.

A control method for a vehicle in accordance with a sixth aspect of the present invention is a control method for a vehicle including: a passenger seat on which a passenger rides on; a main body that support the passenger seat; a traveling mechanism that moves the main body; a sensor that outputs a measurement signal according to a force exerted on a seat surface of the passenger seat; and a passenger-seat drive mechanism that drives the passenger seat so as to change an angle of the seat surface of the passenger seat, the control method including: a step of inputting a balanced position posture of the passenger seat; and a step of calculating a reference input used to drive the traveling mechanism and the passenger-seat drive mechanism based on the measurement signal from the sensor, the balanced position posture, and a drive amount of the passenger-seat drive mechanism.

A control method in accordance with a seventh aspect of the present invention is the above-described control method, wherein a signal according to a posture angle of the vehicle is output by a posture sensing unit provided in the vehicle, and the balanced position posture of the passenger seat is changed according to an output of the posture sensing unit.

A control method in accordance with an eighth aspect of the present invention is the above-described control method, wherein the balance position posture of the passenger seat is changed so that a riding surface of the passenger seat becomes horizontal.

A control method in accordance with a ninth aspect of the present invention is the above-described control method, wherein the balance position posture of the passenger seat is unchanged irrespective of a traveling state of the vehicle. In this way, the operability can be easily improved.

A control method in accordance with a tenth aspect of the present invention is the above-described control method, wherein a target drive amount of the passenger-seat drive mechanism is calculated based on the drive amount of the passenger-seat drive mechanism, the balanced position posture of the passenger seat, and the measurement signal from the sensor, and a forward/backward movement speed of the vehicle is calculated based on the target drive amount of the passenger-seat drive mechanism. In this way, the vehicle can move at a proper speed.

Advantageous Effects of Invention

In accordance with the present invention, it is possible to provide a vehicle having high operability and its control method.

DESCRIPTION OF EMBODIMENTS

Exemplary embodiments of a compact vehicle in accordance with the present invention are explained hereinafter in detail with reference to the drawings. However, the present invention is not limited to the following exemplary embodiments. Further, the following description and the drawings are simplified as appropriate for clarifying the explanation.

<Overall Configuration>

Figure 1:
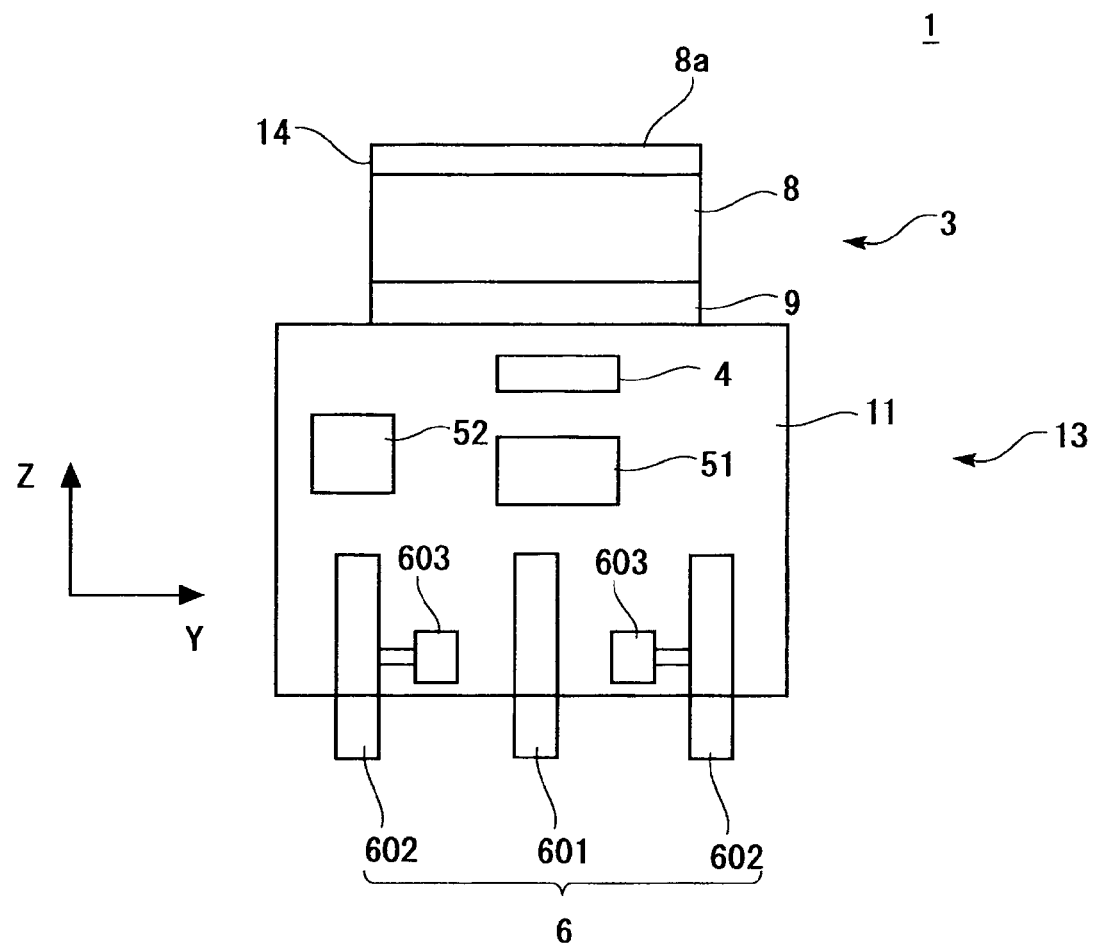
FIG. 1 is a front view schematically showing a vehicle in accordance with the present invention.
Figure 2:
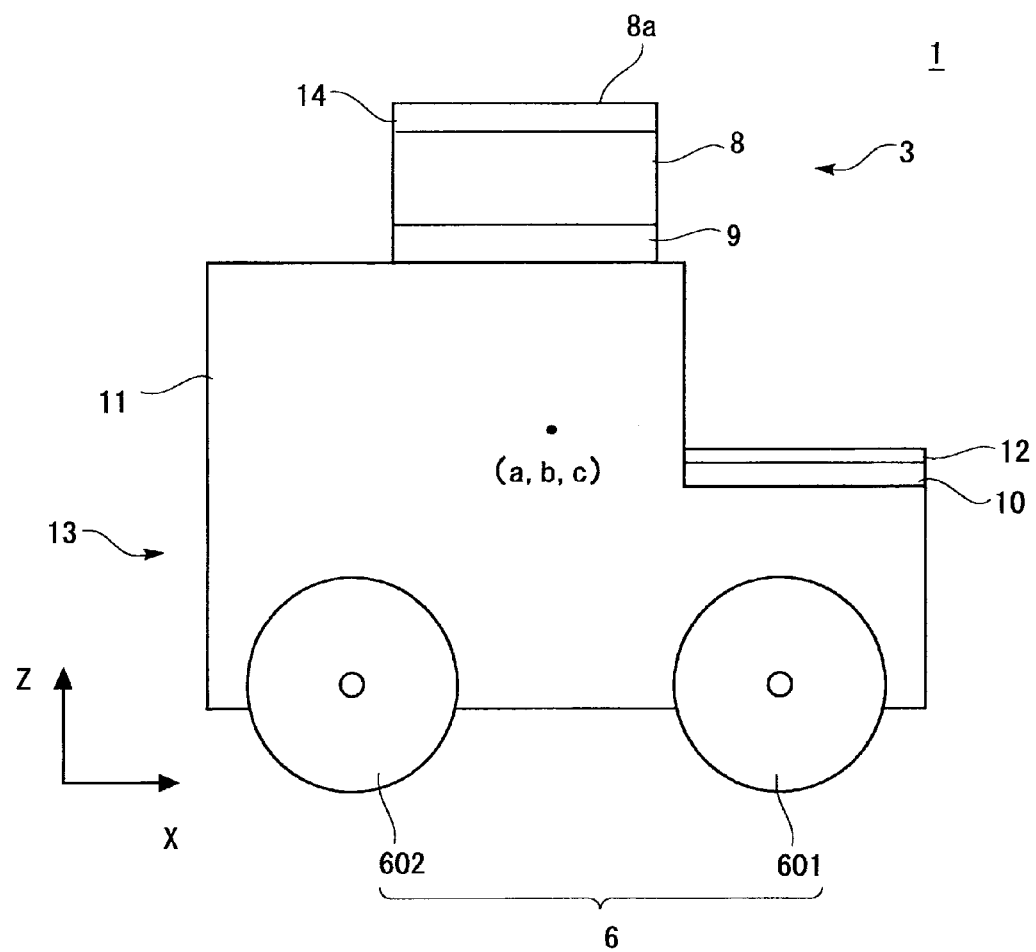
FIG. 2 is a side view schematically showing a vehicle in accordance with the present invention.

An overall configuration of a vehicle 1 in accordance with the present invention is explained with reference to the drawings. Firstly, an overall configuration of the vehicle 1 is explained with reference to FIGS. 1 and 2. FIG. 1 is a front view schematically showing a configuration of the vehicle 1, and FIG. 2 is a side view schematically showing the configuration of the vehicle 1. Note that in each of FIGS. 1 and 2, an orthogonal coordinate system composed of XYZ axes is also illustrated. Y-axis represents the left/right direction of the vehicle 1; X-axis represents the forward/backward direction of the vehicle 1; and Z-axis represents the vertical direction. Therefore, X-axis corresponds to the roll axis; Y-axis corresponds to the pitch axis; and Z-axis corresponds to the yaw axis. In FIGS. 1 and 2, the explanation is made on the assumption that +X direction represents the forward direction of the vehicle 1. Note that the overall configuration of the vehicle 1 shown in FIGS. 1 and 2 is basically common throughout all the exemplary embodiments explained below.

As shown in FIG. 1, the vehicle 1 includes a riding portion 3 and a chassis 13. The chassis 13, which is the main body of the vehicle 1, supports the riding portion 3. The chassis 13 includes a posture sensing unit 4, wheels 6, a footrest 10, a housing 11, a control calculation unit 51, a battery 52, and the like. The wheels 6 include a front wheel 601 and rear wheels 602. In this example, a three-wheel type vehicle 1 including one front wheel 601 and two rear wheels 602 is explained.

The riding portion 3 includes a passenger seat 8 and a force sensor 9. Further, the upper surface of the passenger seat 8 serves as a seat surface 8a. That is, the vehicle 1 moves with a passenger riding on the seat surface 8a. The seat surface 8a may be formed into a flat surface, or formed into a shape conforming to the shape of buttocks. Further, the passenger seat 8 may be equipped with a backrest. That is, the passenger seat 8 may be formed into a wheelchair-like shape. The passenger seat 8 may be provided with cushioning to improve the riding quality. When the vehicle 1 is put on a level surface, the seat surface 8a becomes horizontal. The force sensor 9 detects a shift of the passenger's body weight. That is, the force sensor 9 detects a force exerted on the seat surface 8a of the passenger seat 8. Then, the force sensor 9 outputs measurement signals according to the force exerted on the seat surface 8a. The force sensor 9 is disposed below the passenger seat 8. That is, the force sensor 9 is disposed between the chassis 13 and the passenger seat 8.

Figure 3:
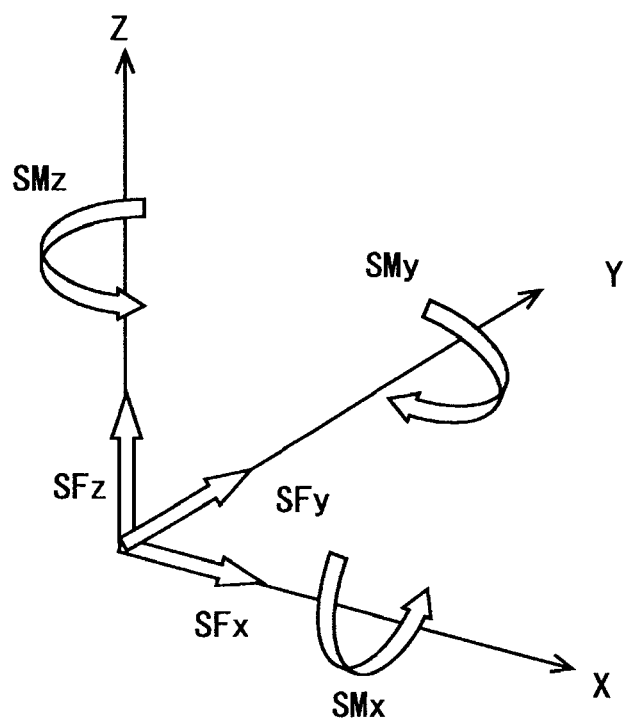
FIG. 3 is a diagram for explaining a motion around each axis.

For example, a six-axis force sensor can be used as the force sensor 9. In such a case, translational forces in three axis directions (SFx, SFy, SFz) and moments around the respective axes (SMx, SMy, SMz) are measured as shown in FIG. 3. These translational forces and moments are represented by values that are measured using the center of the force sensor 9 as the origin. Assuming that the measurement signals output to the sensor processing unit of the vehicle 1 are moments (Mx, My, Mz), and that the origin of the control coordinate of these moments is located at a point (a, b, c) shown in FIG. 2, each of the moments Mx, My and Mz can be expressed as shown bellow.

$$Mx = SMx + c \cdot SFy - b \cdot SFz$$

$$My = SMy + a \cdot SFz - c \cdot SFx$$

$$Mz = SMz + b \cdot SFx - a \cdot SFy$$

Note that FIG. 3 is a diagram for explaining each axis. Any sensor capable of measuring the moments (Mx, My, Mz) may be used as the force sensor 9. Mx, My and Mz may be directly measured by disposing a three-axis force sensor capable of measuring the moments (SMx, SMy, SMz) around the respective axes at the origin of the control coordinate. Alternatively, three single-axis force sensors may be disposed. Alternatively, a strainmeter or an analog joystick using a potentiometer may be used. That is, any measurement device capable of measuring moments around three axes in a direct or indirect manner may be used. Then, the force sensor 9 outputs three moments (Mx, My, Mz) as measurements signals.

Further, the passenger seat 8 includes a riding position sensing unit 14 that detects a riding position. The riding position sensing unit 14 includes a plurality of tactile sensors or the like. For example, a plurality of tactile sensors are arranged in array on the seat surface 8a of the passenger seat 8. Each of the tactile sensors outputs a touch signal when an object is in contact with its upper surface. Then, the riding position sensing unit 14 detects the riding position of a passenger based on touch signals from the plurality of tactile sensors. Specifically, a riding position that is obtained when a passenger sits in the reference position on the seat surface 8a is defined as the origin. Then, a deviation of the actual riding position of a passenger from the origin is detected. The deviation of the riding position is detected for each of X-direction and Y-direction. The riding position can be detected based on the difference of the distribution of tactile sensors that are outputting touch signals.

In the chassis 13, which is the main body of the vehicle 1, the posture sensing unit 4, the wheels 6, the footrest 10, the housing 11, the control calculation unit 51, the battery 52, and the like are disposed. The housing 11 has a box-like shape with a protruding front-lower portion. Further, the footrest 10 is disposed on this protruding portion. The footrest 10 is disposed in front of the passenger seat 8 Therefore, when a passenger rides on the passenger seat 8, both legs of the passenger are placed on the footrest 10.

The footrest 10 includes a determination unit 12 that determines whether a passenger is on the vehicle or not. For example, the determination unit 12 includes a plurality of tactile sensors or the like. For example, a plurality of tactile sensors are arranged in array on the upper surface of the footrest 10. Each of the tactile sensors outputs a touch signal when an object is in contact with its upper surface. Based on these touch signals, it is determined whether the soles of a passenger are in contact with the footrest 10 or not. When a group of tactile sensors that are in contact with an object resembles soles in shape, it is determined that a passenger is on the vehicle. That is, whether a passenger is on the vehicle or not is determined based on whether the contacting area resembles soles or not. Further, it is also possible to determine whether a passenger is on the vehicle or an object other than a human is put on the vehicle. By using the determination unit 12 provided on the footrest 10, rather than using the force sensor 9, to determine the presence/absence of a passenger, it is possible to make more reliable determination. That is, even if an object is put on the passenger seat 8, it is possible to prevent the vehicle from mistakenly recognizing that a passenger is on the vehicle.

The housing 11 incorporates driving motors 603, the posture sensing unit 4, the control calculation unit 51, and the battery 52. The battery 52 supplies an electric power to various electric devices such as the driving motors 603, the posture sensing unit 4, the control calculation unit 51, the determination unit 12, the riding position sensing unit 14, and the force sensor 9. The posture sensing unit 4 includes a gyroscopic sensor or an acceleration sensor, for example, and detects the posture of the vehicle 1. That is, when the chassis 13 is inclined, the posture sensing unit 4 detects its inclination angle and/or inclination angular speed. The posture sensing unit 4 detects the posture inclination angle around the roll axis and the posture inclination angle around the pitch axis. Then, the posture sensing unit 4 outputs posture measurement signals to the control calculation unit 51.

The wheels 6 are rotatably attached to the housing 11. In this example, three disc-shaped wheels are disposed. A part of each wheel 6 protrudes beyond the lower surface of the housing 11. Therefore, the wheels 6 are in contact with the floor surface. Two rear wheels 602 are disposed in the rear part of the housing 11. The rear wheels 602 are driving wheels, and are rotated by the driving motors 603. That is, by driving the driving motors 603, the rear wheels 602 rotate around their axles. The rear wheels 602 are disposed on both of left and right sides. Note that an encoder used to measure the rotation speed of the wheel is provided inside each rear wheel 602. The axle of the left rear wheel 602 and the axle of the right rear wheel 602 are coaxially arranged.

Further, the wheels 6 include the front wheel 601. That is, one front wheel 601 is disposed at the center of the front part of the housing 11. Therefore, the front wheel 601 is disposed between the two rear wheels 602 in Y-direction. The passenger seat 8 is disposed between the axle of the front wheel 601 and the axis of the rear wheels 602 in X-direction. The front wheel 601 is a trailing wheel (auxiliary wheel), and rotates according to the movement of the vehicle 1. That is, the front wheel 601 rotates according to the direction and speed of the movement that are determined by the rotations of the rear wheels 602. By providing the front wheel 601, which serves as an auxiliary wheel, in front of the rear wheels 602, it is possible to prevent the vehicle from tumbling down. The front wheel 601 is disposed below the footrest 10.

The control calculation unit 51 is an arithmetic processing device including a CPU (Central Processing Unit), a ROM (Read Only Memory), a RAM (Random Access Memory), a communication interface, and the like. Further, the control calculation unit 51 also includes a detachable HDD, an optical disk, a magneto-optic disk, and the like, and thereby stores various programs and control parameters. Then, when necessary, the control calculation unit 51 supplies these programs and data to the memory (not shown) and the like. Needless to say, the control calculation unit 51 does not necessarily have to be constructed as a single physical structure. The control calculation unit 51 performs processing to control the operation of the driving motors 603 according to the output from the force sensor 9.

First Exemplary Embodiment

Figure 4:
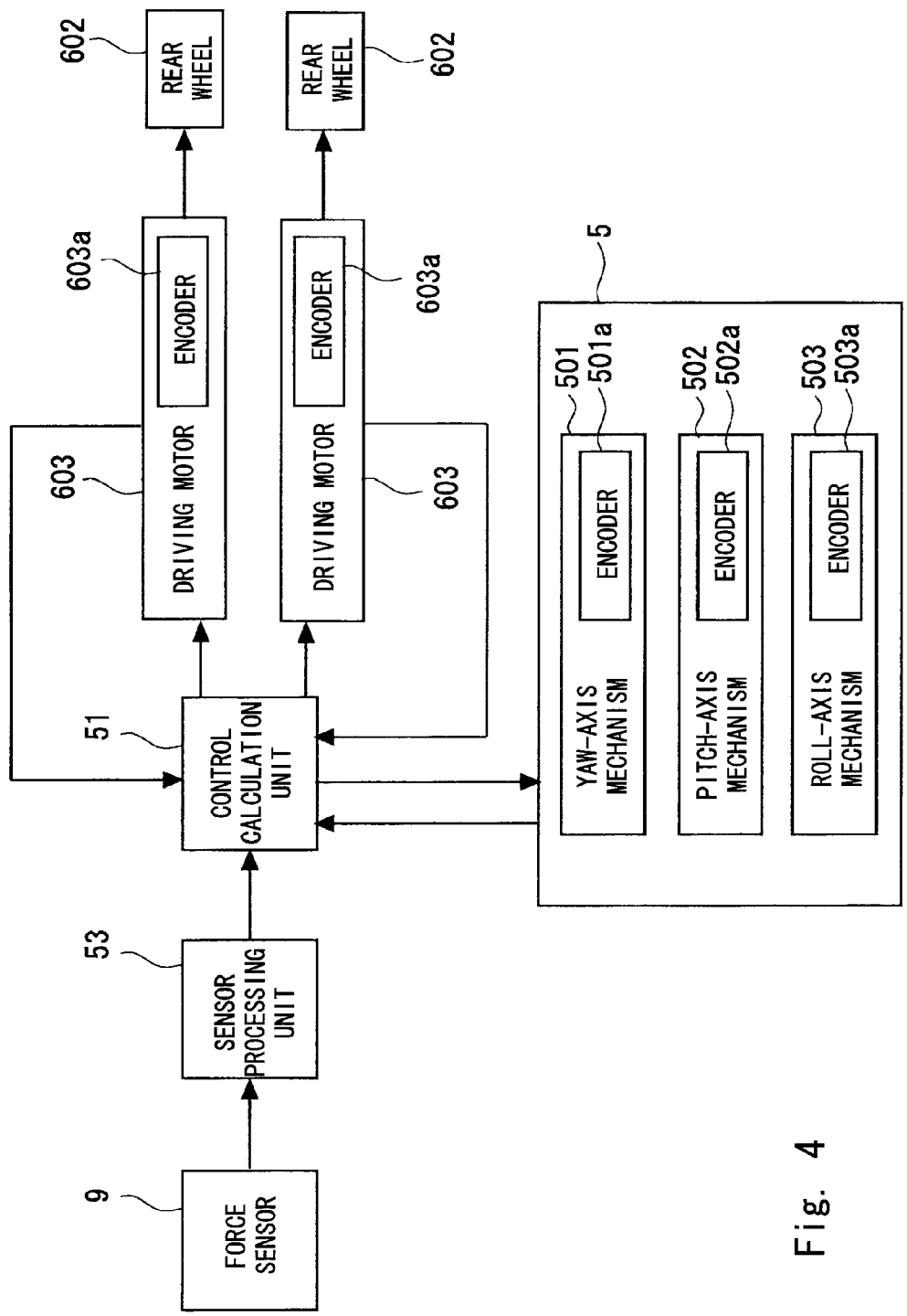
FIG. 4 is a block diagram showing a control system used to move a vehicle.

Next, a control system used to move the vehicle 1 in accordance with the first exemplary embodiment is explained with reference to FIG. 4. FIG. 4 is a block diagram showing a configuration of a control system used to move the vehicle 1. Firstly, the force sensor 9 detects a force exerted on the seat surface 8a. A sensor processing unit 53 performs processing for measurement signals from the force sensor 9. That is, it performs arithmetic processing for measured data corresponding to the measurement signals output from the force sensor 9. As a result, input moment values to be input to the control calculation unit 51 are calculated. Note that the sensor processing unit 53 may be contained in the force sensor 9, or contained in the control calculation unit 51.

In this way, moments (Mx, My, Mz) measured by the force sensor 9 are converted into input moment values (Mx', My', Mz') around the respective axes. Then, the input moment values are used as input values used to operate the respective rear wheels 602. In this way, the sensor processing unit 53 calculates an input value for each axis. The magnitudes of the input moment values are determined according to the magnitudes of the moments. The signs of the input moment values are determined based on the signs of the measured moments. That is, when the moment is positive, the input moment value becomes a positive value, whereas when the moment is negative, the input moment value becomes a negative value. For example, when the moment Mx is positive, the input moment value Mx' becomes a positive value. Therefore, these input moment values become input values corresponding to the intended operation by the passenger.

The control calculation unit 51 obtains an input torque τi based on the input moment values (Mx', My', Mz'). For example, input torque τi=(Mx', My', Mz'). Then, control calculation is performed based on this torque τi. As a result, reference inputs used to drive the driving motors 603 are calculated. In general, the larger the torque τi is, the larger the reference inputs become. These reference inputs are output to the driving motors 603. Note that in this exemplary embodiment, since the left and right rear wheels 602 are the driving wheels, two driving motors 603 are illustrated in the figure. Further, one of the driving motors 603 rotates the right rear wheel 602 and the other of the driving motors 603 rotates the left rear wheel 602. The driving motors 603 rotate the rear wheels 602 based on the reference inputs. That is, the driving motors 603 provide reference torques used to rotate the rear wheels 602, which are the driving wheels. Needless to say, the driving motors 603 may provide rotation torques to the rear wheels 602 through a speed reducer or the like. For example, when reference torques are supplied from the control calculation unit 51 as reference inputs, the driving motors 603 rotate with those reference torques. As a result, the rear wheels 602 rotate so that the vehicle 1 moves to a desired direction at a desired speed. Needless to say, the reference inputs are not limited to the torques of the driving motors 603. That is, the reference input may be the rotation speed or the number of revolutions.

Further, an encoder 603a is provided inside each driving motor 603. These encoders 603a detect the rotation speeds or the like of the driving motors 603. Then, the measured rotation speeds are input to the control calculation unit 51. The control calculation unit 51 performs feedback control based on the current rotation speeds and target rotation speeds. For example, a reference input is calculated by multiplying a difference between the target rotation speed and the current rotation speed by an appropriate feedback gain. Needless to say, the reference inputs supplied to the left and right driving motors 603 may be different from each other. That is, when the vehicle moves straight to the forward or backward direction, the left and right rear wheels 602 are controlled so that their rotation speeds become equal to each other. However, when the vehicle turns left or right, the left and right rear wheels 602 are controlled so that they rotate in the same direction but at different rotation speeds. Further, when the vehicle rotates on its own axis, the left and right rear wheels 602 are controlled so that they rotate in opposite directions.

For example, when the passenger takes a forward-inclined posture, a force is exerted on the passenger seat 8 in a direction around the pitch axis. As a result, the force sensor 9 detects +My moment (see FIG. 3). Based on this +My moment, the sensor processing unit 53 calculates an input moment value My' used to translate the vehicle 1. Similarly, the sensor processing unit 53 also calculates input moment values Mx' and Mz' based on Mx and Mz respectively. In this way, a torque .tau.i is obtained.

The control calculation unit 51 calculates reference inputs based on the input moment values and the measured values of the encoders. As a result, the left and right rear wheels 602 rotate at a desired speed. Similarly, when the vehicle turns right, the passenger shifts his/her body weight to the right. As a result, a force is exerted on the passenger seat in a direction around the roll axis, and therefore the force sensor 9 detects +Mx moment. Based on this +Mx moment, the sensor processing unit 53 calculates an input moment value Mx' used to turn the vehicle 1 to the right. That is, a rudder angle corresponding to the direction to which the vehicle 1 moves is obtained. Then, the control calculation unit 51 calculates reference inputs according to the input moment value. The left and right rear wheels 602 rotate at different rotation speeds according to the reference inputs. That is, the left rear wheel 602 rotates at a higher rotation speed than that of the right rear wheel 602.

Components for the translation movement in the forward/backward direction are obtained based on My'. That is, a driving torque or the like necessary to drive the left and right rear wheels 602 at the same rotation speed in the same direction is determined. Therefore, the larger the input moment value My', i.e., moment My is, the faster the vehicle 1 moves. The traveling direction, i.e., components for the rudder angle are obtained based on Mx'. That is, the difference between the rotational torques of the left and right rear wheels 602 is determined. Therefore, the larger the input moment value Mx', i.e., moment Mx is, the larger the difference between the rotation speeds of the left and right rear wheels 602 becomes.

Components for the rotation on its own axis are obtained based on Mz'. That is, components necessary to drive the left and right rear wheels 602 in opposite directions to rotate the vehicle on its own axis are obtained. Therefore, the larger the input moment value Mz', i.e., moment Mz is, the larger the rotation speeds in opposite directions of the left and right rear wheels 602 becomes. For example, when Mz' is positive, a driving torque or the like necessary to rotate the vehicle on its own axis in the counter-clockwise direction as viewed from the top is determined. That is, the right rear wheel 602 rotates forward and the left rear wheel 602 rotates backward at the same rotation speed.

Then, reference inputs used to drive the two rear wheels 602 are calculated by combining three components calculated based on the respective input moment values Mx', My' and Mz'. In this way, reference inputs for the respective left and right rear wheels 602 are calculated. A driving torque, a rotation speed, or the like is calculated as the reference input. That is, reference inputs for the left and right rear wheels 602 are calculated by combining values each calculated as one of the components corresponding to the input moment values Mx', My' and Mz'. In this way, the vehicle 1 moves based on the input moment values Mx', My' and Mz' calculated based on the measured moments Mx, My and Mz. That is, the traveling direction and the traveling speed of the vehicle 1 are determined based on the moments Mx, My and Mz that are generated by the weight shift of the passenger.

In this way, an inputting operation to move the vehicle 1 is performed by the action of the passenger. That is, when the passenger's posture is changed, a moment around each axis is detected. Then, the vehicle 1 moves based on the measured values of these moments. In this way, the passenger can easily operate the vehicle 1. That is, the operation using a joystick or a handle becomes unnecessary, thus making it possible to operate the vehicle by the weight shift alone. For example, when the passenger wants to move to the forward-right direction, the passenger shifts his/her body weight to the forward-right direction. Further, when the passenger wants to move to the backward-left direction, the passenger shifts his/her body weight to the backward-left direction. In this way, the position of the center of gravity of the passenger is changed, and an inputting operation according to that variation is thereby performed. That is, the moments corresponding to the shift of the center of gravity of the passenger are detected, so that the passenger can operate the vehicle by intuition.

Further, the vehicle 1 also includes a drive unit 5 that drives the passenger seat 8. The control for this drive unit 5 is explained hereinafter. The drive unit 5 includes a yaw-axis mechanism 501, a pitch-axis mechanism 502, and a roll-axis mechanism 503. Each of the yaw-axis mechanism 501, pitch-axis mechanism 502, and roll-axis mechanism 503 is a rotational joint, and the posture of the passenger seat 8 is changed by operating these rotational joints. The yaw-axis mechanism 501 rotates the passenger seat 8 around the yaw axis. The pitch-axis mechanism 502 rotates the passenger seat 8 around the pitch axis. The roll-axis mechanism 503 rotates the passenger seat 8 around the roll axis. In this way, the angle of the seat surface 8a is changed with respect to the chassis 13. That is, the seat surface 8a is inclined with respect to the chassis 13. Therefore, the drive unit 5 serves as a drive unit to drive the passenger seat 8, and each of the yaw-axis mechanism 501, pitch-axis mechanism 502, and roll-axis mechanism 503 includes a joint drive motor and a speed reducer. Further, encoders 501a, 502a and 503a are provided in the respective axis mechanisms to detect the rotation angles of the respective joint motors.

The control calculation unit 51 performs control calculation according to the torque supplied from the sensor processing unit 53 as described previously. Further, the control calculation unit 51 outputs reference inputs used to drive the joints of the yaw-axis mechanism 501, pitch-axis mechanism 502, and roll-axis mechanism 503. That is, the control calculation unit 51 calculates a target joint angle of each axis mechanism based on the torque. Further, the control calculation unit 51 calculates reference inputs according to the target joint angles and outputs the reference inputs to the respective motors. As a result, each of the joints of the yaw-axis mechanism 501, pitch-axis mechanism 502, and roll-axis mechanism 503 is adjusted to its target joint angle. That is, each axis mechanism is driven so as to track its target joint angle. Therefore, it is possible to change the posture of the vehicle 1 so that the seat surface 8a of the passenger seat 8 is adjusted to a desired angle.

As described above, the inclination angle of the seat surface 8a is changed according to the input to the force sensor 9. In this way, the passenger can grasp the input value by intuition. Therefore, the operability can be improved.

Figure 5:
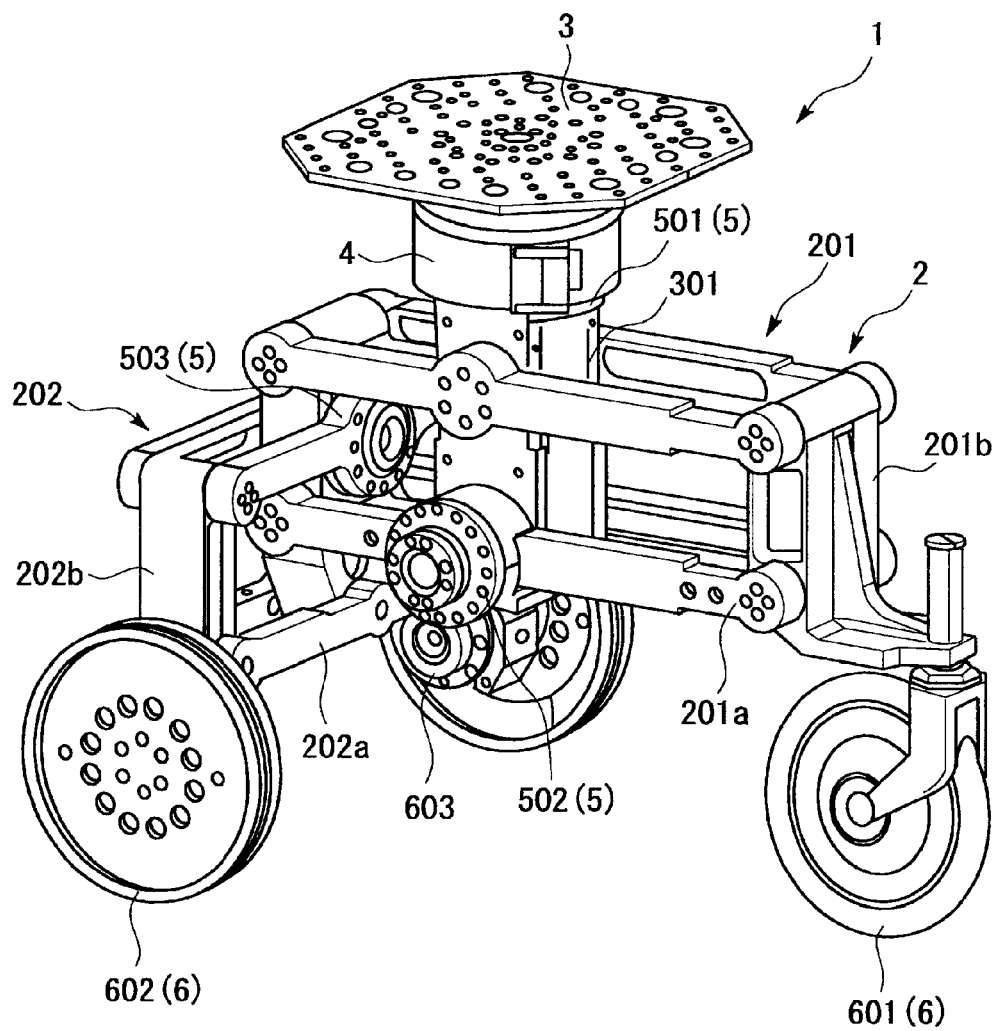
FIG. 5 is a perspective view showing a configuration used to change the posture of a vehicle.

Next, a configuration used to change the posture of the vehicle 1 is explained with reference to FIG. 5. FIG. 5 shows a configuration used to change the posture, and shows the internal structure of the chassis 13. As shown in FIG. 5, a frame unit 2 that controls the posture is provided in the chassis 13. The frame unit 2 is disposed inside the housing 11. In the frame unit 2, a first parallel linkage 201 and a second parallel linkage 202 are connected in a T-shape as viewed from the top in such a manner that each parallel linkage does not restrict the rotation of the other parallel linkage at the intersection.

The first parallel linkage 201 is disposed in the forward/backward direction. This first parallel linkage 201 includes four horizontal links 201a, and front and rear vertical links 201b. All the horizontal links 201a have the same length. Although the illustration is omitted in the figure, an insertion hole into which a connecting shaft used for the connection with the vertical link 201b is inserted is formed in each end of the horizontal link 201a. Two horizontal links 201a are disposed on the top and the bottom, and these two horizontal links 201a constitute a pair of horizontal links 201a. Then, two pairs of horizontal links 201a are disposed on the left and right sides of the vertical links 201b so that they sandwich the vertical links 201b therebetween.

Although the illustration is omitted, connecting shafts used for the connection with the horizontal links 201a are disposed on the left and right sides of the vertical link 201b and protrude to the left and right directions in such a manner that they are aligned with each other with the equal interval therebetween in the vertical direction. Each of the connecting shafts is inserted into an insertion hole of the horizontal link 201a with a shaft bearing or the like interposed therebetween, and serves as the rotation axis of the horizontal link 201a and the vertical link 201b.

In this exemplary embodiment, the front vertical link 201b is formed into an L-shape. The horizontal links 201a are rotatably connected at the top and bottom ends of the vertical piece of the vertical link 201b through the connecting shafts. A free caster is provided at the tip of the horizontal piece of the vertical link 201b as the wheel 6. When the traveling direction of the vehicle 1 is changed, the direction of the caster is rotated according to the direction change. The rear vertical link 201b includes a protruding portion protruding downward beyond the lower horizontal link 201a. Although the illustration is omitted, connecting shafts used for the connection with the second parallel linkage 202 are disposed on the front and rear sides of the protruding potion and protrude to the forward and backward directions in such a manner that they are aligned with each other. Further, although the illustration is omitted, connecting shafts used for the connection with the second parallel linkage 202 are disposed in an area located between the top and bottom horizontal links 201a on the front and rear sides of the rear vertical link 201b and protrude to the forward and backward directions in such a manner that they are aligned with each other.

The second parallel linkage 202 is disposed in the left-and-right direction. This second parallel linkage 202 includes four horizontal links 202a, and left and right vertical links 202b. All the horizontal links 202a have the same length. Although the illustration is omitted, an insertion hole into which a connecting shaft used for the connection with the vertical link 202b is inserted is formed in each end of the horizontal link 202a. Further, although the illustration is omitted, an insertion hole into which a connecting shaft used for the connection with the first parallel linkage 201 is inserted is formed roughly at the center of the horizontal link 202a in the longitudinal direction. Two horizontal links 202a are disposed on the top and the bottom, and these two horizontal links 202a constitute a pair of horizontal links 202a. Then, two pairs of horizontal links 202a are disposed on the front and rear sides of the vertical link 202b and the rear vertical link 201b of the first parallel linkage 201 so that they sandwich the vertical link 202b and the rear vertical link 201b of the first parallel linkage 201 therebetween. Each of connecting shafts protruding from the rear vertical link 201b of the first parallel linkage 201 is inserted into an insertion hole located roughly at the center of the horizontal link 202a with a shaft bearing or the like interposed therebetween, and serves as the rotation axis of the first parallel linkage 201 and the second parallel linkage 202.

Although the illustration is omitted, connecting shafts used for the connection with the horizontal links 202a are disposed on the front and rear sides of the vertical link 202b and protrude to the forward and backward directions in such a manner that they are aligned with each other with the equal interval therebetween in the vertical direction. Each of the connecting shafts is inserted into an insertion hole located at the end of the horizontal link 202a with a shaft bearing or the like interposed therebetween, and serves as the rotation axis of the horizontal link 202a and the vertical link 202b.

As a result, the first parallel linkage 201 can rotate in the forward-and-backward direction without being restricted by the second parallel linkage 202. Meanwhile, the second parallel linkage 202 can rotate in the left-and-right direction without being restricted by the first parallel linkage 201.

The riding portion 3 is disposed above the posture sensing unit 4, and moves in conjunction with the rotation of the frame unit 2. Specifically, the riding portion 3 is connected to the top and bottom horizontal links 201a of the first parallel linkage 201 through a support shaft 301. Although the illustration is omitted, connecting shafts used for the connection with the top and bottom horizontal links 201a of the first parallel linkage 201 protrude from the left and right sides of an upper portion and a lower portion of the support shaft 301 to the left and right directions. Although the illustration is omitted, an insertion hole into which a connecting shaft protruding from the support shaft 301 is inserted is formed roughly at the center in the longitudinal direction of the horizontal link 201a of the first parallel linkage 201. The support shaft 301 is interposed between the horizontal links 201a, which are disposed on the left and right sides of the vertical links 201b so that they sandwich the vertical links 201b therebetween. The connecting shafts protruding from the support shaft 301 are inserted into insertion holes of the first parallel linkage 201 with a shaft bearing or the like interposed therebetween. As a result, when the first parallel linkage 201 rotates in the forward-and-backward direction, the support shaft 301 and the vertical links 201b work together while maintaining their parallel state.

The frame unit 2 is operated by driving the drive unit 5. As a result, the posture of the vehicle 1 is changed. When the chassis 13 is inclined, the angle of the riding portion 3 is changed. Note that the drive unit 5 includes the yaw-axis mechanism 501 that rotates around the yaw axis, the pitch-axis mechanism 502 that rotates around the pitch axis, and the roll-axis mechanism 503 that rotates around the roll axis. The yaw-axis mechanism 501 is disposed, for example, between the support shaft 301 and the posture sensing unit 4. That is, the yaw-axis mechanism 501 is disposed at a place closest to the riding portion 3 among the three mechanisms. Note that the yaw-axis mechanism 501 is a pivotal joint to rotate the riding portion 3 on its own axis, i.e., on the yaw axis, whereas the pitch-axis mechanism 502 and the roll-axis mechanism 503 are rotational joints to turn the riding portion 3 around the respective axes.

Figure 6:
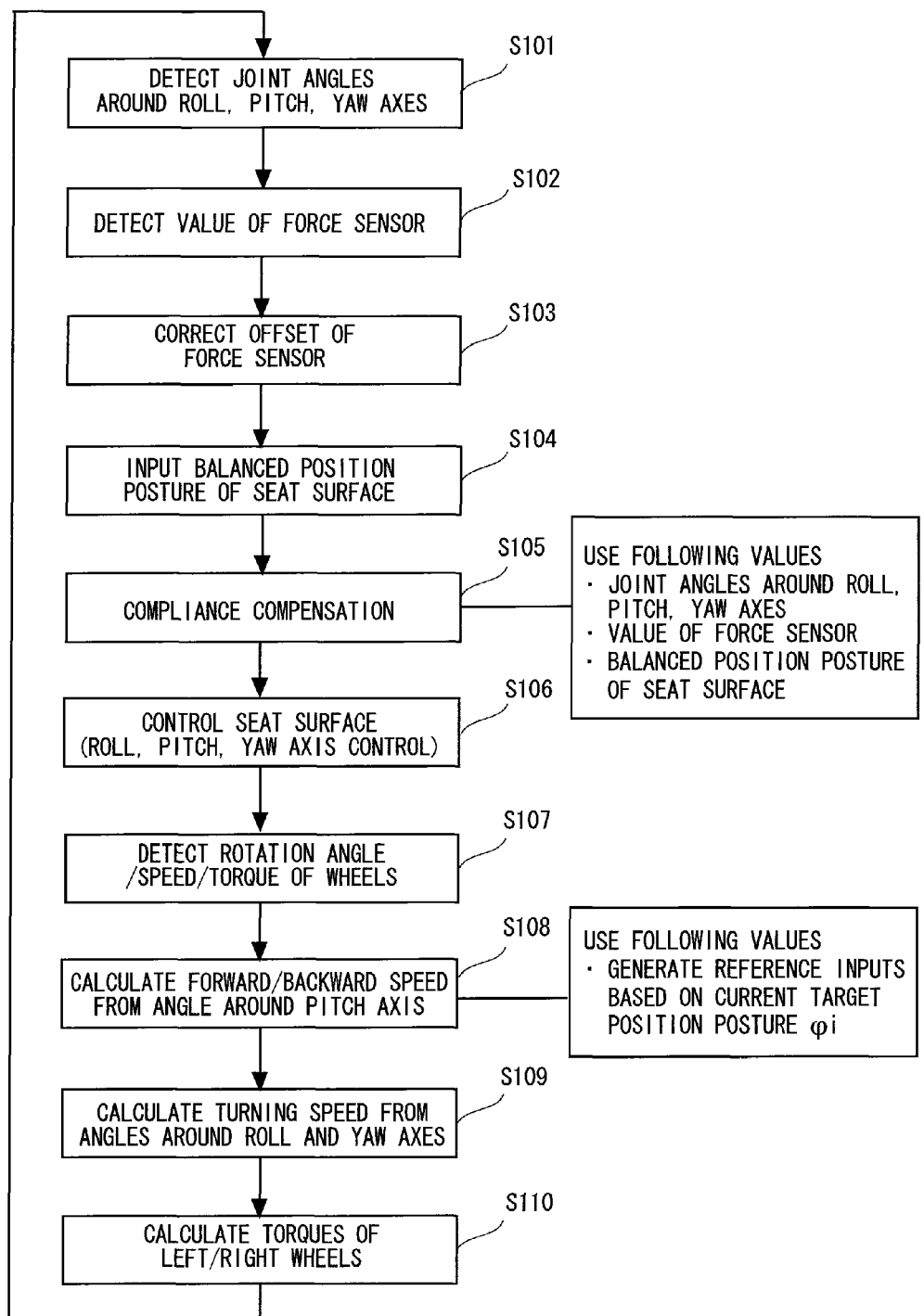
FIG. 6 is a flowchart showing control of a vehicle in accordance with a first exemplary embodiment.

Next, a control method for the vehicle 1 is explained with reference to FIG. 6. FIG. 6 is a flowchart showing a control method of the vehicle 1. FIG. 6 shows one control cycle of the vehicle 1. The movement control and the posture control of the vehicle 1 are performed in accordance with this flowchart. That is, FIG. 6 shows a control method for driving the rear wheels 602 and for driving the drive unit 5.

Firstly, the joint angles of the yaw-axis mechanism 501, pitch-axis mechanism 502, and roll-axis mechanism 503 are detected (step S101). That is, each joint angle is detected by the respective one of the encoders 501a, 502a and 503a provided in the respective axis mechanisms. The vehicle 1 is in a posture corresponding to these joint angles. Next, the force sensor 9 detects the moment values (step S102). That is, the moments (Mx, My, Mz) are measured. Then, an offset correction is performed on the force sensor 9 (step S103). That is, if the position in which the passenger is sitting is deviated, an offset is given to that position. An offset is given to the control target origin so that the positional deviation of the riding position is corrected for the input moments. In this way, it is possible to calculate moments (Mx', My', Mz') in which the positional deviation is corrected. Note that the steps S101 and S102 may be performed in the reversed order, or may be simultaneously performed.

The balanced position posture $\phi id$ of the seat surface is input (step S104). As described previously, the balanced position posture is the position in which the seat surface 8a is horizontal when the vehicle 1 is moving on the flat floor. The joint angles of the yaw-axis mechanism 501, pitch-axis mechanism 502, and roll-axis mechanism 503 in this state correspond to the balanced position posture. Therefore, the balanced position posture is unchanged in this exemplary embodiment. That is, a balanced position posture in which the joint angle around each axis remains unchanged regardless of the traveling state is selected.

Next, compliance compensation is performed (step S105). With this compliance control, the target joint angles of the yaw-axis mechanism 501, pitch-axis mechanism 502, and roll-axis mechanism 503 are determined. The compliance control is control in which the subject to be controlled behaves with a pseudo-spring characteristic and a pseudo-dumping characteristic. The spring characteristic and the dumping characteristic are exhibited by the actions of the yaw-axis mechanism 501, pitch-axis mechanism 502, and roll-axis mechanism 503. By introducing the compliance control, the seat surface 8a can be inclined according to the force exerted by the passenger. In this example, the compliance control is performed by using the joint angles of the yaw-axis mechanism 501, pitch-axis mechanism 502, and roll-axis mechanism 503, the moments of the force sensor 9, and the balanced position posture of the seat surface 8a. In this way, the target angles of the yaw-axis mechanism 501, pitch-axis mechanism 502, and roll-axis mechanism 503 are calculated. The details of this step are explained later.

Then, the seat surface 8a is controlled (step S106). That is, the motor provided for each axis is driven so that the yaw-axis mechanism 501, pitch-axis mechanism 502, and roll-axis mechanism 503 are adjusted to their respective target joint angles. As a result, the inclination of the seat surface 8a is changed and the current target position posture is achieved. In this example, the inclination of the seat surface 8a is changed according to the output of the force sensor 9. That is, the passenger receives a force from the seat surface 8a according to the force to the seat surface 8a. Therefore, the passenger 19 can intuitively grasp the input to the force sensor 9. In this way, the operability is improved and the vehicle can move as the passenger 19 intended.

Next, the rotation angles, the speeds, and the torques of the wheels are detected (step S107). That is, the operation state of the left and right rear wheels 602 are detected based on the output of the encoders 603a. Then, the forward/backward movement speed of the vehicle 1 is calculated from the target joint angle around the pitch axis (step S108). In this process, the forward/backward movement speed is calculated based on the current target position posture $\phi i$ calculated in the step S105. That is, the control calculation unit 51 calculates the forward/backward movement speed based on the target joint angle of the pitch-axis mechanism 502. Therefore, the target forward/backward movement speed is determined based on the moments of the force sensor 9, the balanced position posture of the seat surface, and the angle of each joint.

Further, the turning speed of the vehicle 1 is calculated from the joint angles around the roll axis and the yaw axis (step S109). The control calculation unit 51 calculates the turning speed based on the current target position posture $\phi i$ obtained in the step S105. That is, the control calculation unit 51 calculates the forward/backward movement speed based on the target joint angles of the yaw-axis mechanism 501 and the roll-axis mechanism 503. Therefore, the target forward/backward movement speed is determined based on the moments of the force sensor 9, the balanced position of the seat surface, and the angle of each joint.

Then, by combining the forward/backward movement speed and the turning speed, the rotation torques of the left and right rear wheels 602 are calculated (step S110). That is, the rotation torques necessary to rotate the rear wheels 602 are calculated. The torques of the left and right rear wheels 602 are output to the driving motors 603 as reference inputs. In this example, feedback control is performed by using the rotation angles of the rear wheels 602 detected in the step S107 and the target speeds. The control calculation unit 51 outputs reference inputs used to drive the driving motors 603. As a result, the vehicle 1 moves at a speed close to the forward/backward movement speed calculated in the step S108 and close to the turning speed calculated in the step S109. Therefore, the vehicle 1 moves according to the input by the force sensor 9 as the passenger intended.

Figure 7:
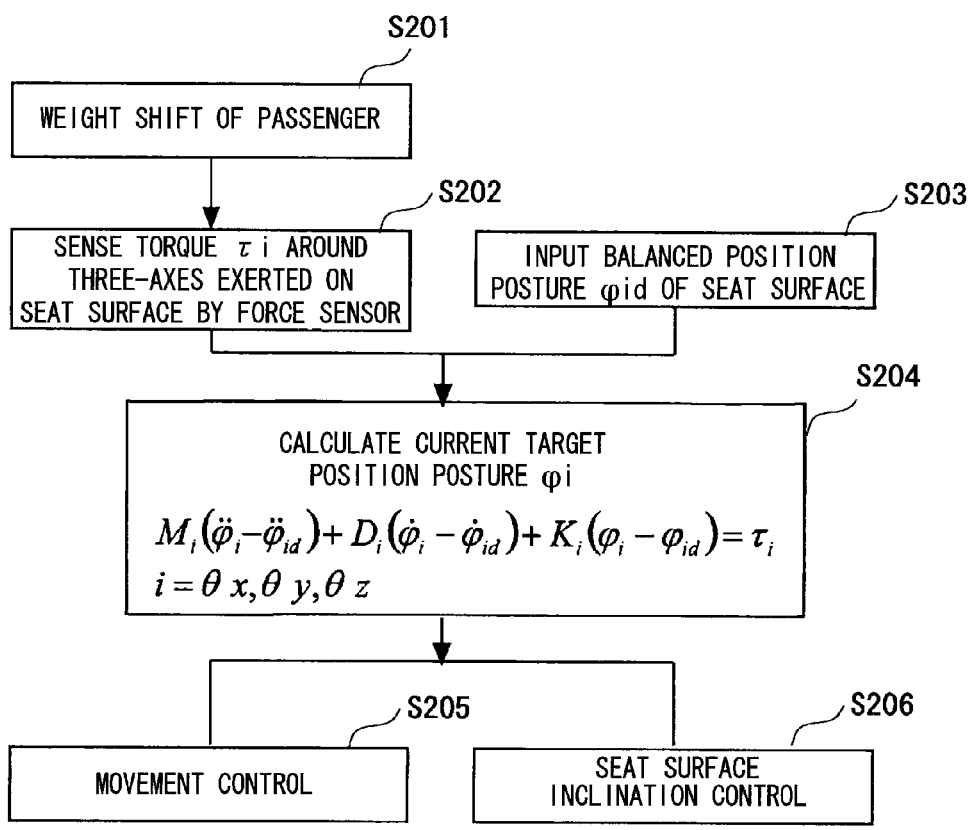
FIG. 7 is a flowchart showing compliance control in a vehicle in accordance with a first exemplary embodiment.

Next, the compliance compensation in the step S105 is explained with reference to FIG. 7. FIG. 7 is a flowchart showing the details of the compliance control. Firstly, the passenger shifts his/her body weight (step S201). That is, the passenger performs an inputting operation by the weight shift in order to move the vehicle 1. As a result, the force exerted on the force sensor 9 is changed. The force sensor 9 senses the torque $\tau i$ around the three axes exerted on the seat surface 8a (step S201). This torque $\tau i$ can be calculated from the input moments. Each of a torque $\tau\theta z$ (=Mz') around the yaw axis, a torque $\tau\theta y$ (=My') around the pitch axis, a torque $\tau\theta x$ (=Mx') around the roll axis is calculated. As described above, $\tau i$ is a torque and includes components for the roll, the pitch, and the yaw. That is, $\tau i$ includes three components of $\tau\theta x$, $\tau\theta y$ and $\tau\theta z$.

Further, in parallel with the steps S201 and S202, the balanced position posture $\phi id$ of the seat surface is input (step S203). This balanced position posture $\phi id$ indicates the reference position used as references of the yaw-axis mechanism 501, pitch-axis mechanism 502, and roll-axis mechanism 503. That is, joint angles used as the references of the respective axis mechanisms are input to the control calculation unit 51. In this exemplary embodiment, the balanced position posture $\phi id$ of the seat surface has a fixed value. Joint angles at which a balanced position posture $\phi id$ is achieved are stored in a memory or the like of the control calculation unit 51. Then, the balanced position posture $\phi id$ is input by reading these joint angles. The balanced position is the position in which the seat surface 8a is horizontal when the vehicle 1 is moving on the flat floor. Therefore, the balanced position posture $\phi id$ is expressed by constant joint angles in the respective axis mechanisms. The balanced position posture $\phi id$ is defined around each axis. The balanced position posture $\phi id$ is composed of three components including a balanced position posture $\phi\theta xd$ around the roll axis, a balanced position posture $\phi\theta yd$ around the pitch axis, and a balanced position posture $\phi\theta zd$ around the yaw axis. These components correspond to the joint angles used as the references of the respective axis mechanism.

Next, the current target position posture $\phi i$ is obtained from the torque $\tau i$ and the balanced position posture $\phi id$ (step S204). In this example, the control calculation unit 51 calculates the current target position posture $\phi i$ of the riding portion 3 based on the equations shown in the step S204. That is, by solving the equations shown in the step S204, the current target position posture $\phi i$ can be calculated. The current target position posture $\phi i$ is composed of, for example, the target joint angle of the yaw-axis mechanism 501, the target joint angle of the pitch-axis mechanism 502, and the target joint angle of the roll-axis mechanism 503. Therefore, the current target position posture $\phi i$ is composed of three components of $\phi\theta x$, $\phi\theta y$ and $\phi\theta z$. The target joint angle in each axis mechanism is calculated based on the torque $\tau i$ and the balanced position posture $\phi id$.

In the equations in the step S204: Mi is an inertia matrix; Di is a viscosity coefficient matrix; and Ki is a stiffness matrix. Further, each of these matrices is a 3×3 matrix. The inertia matrix, viscosity coefficient matrix, and stiffness matrix can be defined according to the configuration and/or action of the vehicle 1. Further, the mark "•" (dot) added above $\phi i$ and $\phi id$ indicates a differentiation with respect to time. One dot indicates a single differentiation and two dots indicate a double differentiation. For example, when one dot is added above $\phi i$, it becomes a target posture speed. Further when two dots are added, it becomes a target posture acceleration. Similarly, when one dot is added above $\phi id$, it becomes a balanced position posture speed. Further, when two dots are added, it becomes a balanced position posture acceleration. In this exemplary embodiment, the balanced position posture $\phi id$ is constant. Therefore, basically, the balanced position posture speed and the balanced position posture acceleration become zeros.

Then, movement control is performed based on the current target position posture $\phi i$ (step S205). Further, in parallel with the movement control, the angle of the seat surface is controlled (step S206). In the movement control, the forward/backward movement speed and the turning speed are calculated based on the current target position posture $\phi i$ as shown in the steps S108 and S109. That is, the forward/backward movement speed is determined according to the current target position posture $\phi\theta y$. The forward/backward movement speed increases with the increase of the value of $\phi\theta y$. Further, the turning speed of the vehicle 1 is determined according to the current target position postures $\phi\theta x$ and $\phi\theta z$. The turning speed increases with the increase of the values of $\phi\theta x$ and $\phi\theta z$. Then, the rotation torques of the left and right rear wheels 602 are calculated from the forward/backward movement speed and the turning speed. In this example, the target rotation speeds for the left and right rear wheels 602 are calculated by combining the forward/backward movement speed and the turning speed. Then, feedback control is performed by using the difference between the current rotation speeds and the target rotation speeds to calculate the rotation torques. The control calculation unit 51 outputs these rotation torques to the driving motors 603 as reference inputs. In this manner, the movement control is performed.

The inclination of the seat surface 8a is also controlled based on the current target position posture $\phi i$. That is, a reference input for each axis mechanism is calculated by using the current target position posture $\phi i$ as an input. A reference input for each axis mechanism is calculated based on the current target position posture $\phi i$. Then, the yaw-axis mechanism 501, pitch-axis mechanism 502, roll-axis mechanism 503 are driven according to these reference inputs. Therefore, the inclination of the seat surface 8a is changed so that the target joint angle of the yaw-axis mechanism 501, the target joint angle of the pitch-axis mechanism 502, and the target joint angle of the roll-axis mechanism 503 are achieved. In this way, each axis mechanism is driven so as to track its target joint angle. As a result, the posture of the riding portion 3 is changed and the inclination of the seat surface 8a is thereby changed. Therefore, the passenger receives a force from the seat surface 8a. Then, the seat surface 8a is adjusted to the current target position posture $\phi i$.

In this manner, the movement control and the inclination control of the seat surface 8a are performed by using the current target position posture $\phi i$. That is, a reference input for each motor is calculated based on the current target position posture $\phi i$. The control calculation unit 51 calculates reference inputs used to drive the rear wheels 602 and the drive unit 5, which drives the passenger seat, based on the drive amount of the drive unit 5, the balanced position posture of the seat surface 8a, and the measurement signals from the force sensor 9.

As described above, the mechanism to attach the passenger seat 8 to the chassis 13 does not use the rigid connection, but does use the structure that is deformed and displaced to some extent in response to the input. Therefore, the control that makes flexible movement like a spring possible can be realized. That is, the drive unit 5 functions like the suspension system of a car. Further, the drive unit 5 is controlled based on a detection result in the force sensor 9.

In this way, the operability can be improved. That is, the axis mechanisms are driven around the respective axes, so that the passenger can grasp how much operation amount he/she is operating the vehicle with. The passenger can recognize the difference between the actual operation amount and the intended operation amount. Therefore, the passenger can minimize the deviation of the actual operation amount from the intended operation amount. Further, even when the passenger is subjected to a centrifugal force, the passenger can perform an operation necessary to achieve the intended movement. That is, it is possible to prevent the vehicle from accelerating to a speed higher than necessary or decelerating to a speed lower than necessary. As a result, it is possible to realize a vehicle 1 having high operability.

In this exemplary embodiment, the joint angles at which the passenger seat is adjusted to the balanced position posture are unchanged irrespective of the traveling state. The passenger can easily grasp the operation amount. For example, when the passenger relaxes, the seat surface 8a returns to the balanced position posture. In this way, the operability can be improved. Further, the movement control is also performed based on the current target position posture $\phi i$. In this way, the forward/backward movement speed and the turning speed can be calculated as the passenger intended. Therefore, the operability can be improved. The control calculation unit 51 calculates reference inputs used to drive the rear wheels 602 and the drive unit 5 based on the drive amount of the drive unit 5, the balanced position posture φid of the passenger seat 8, and the measurement signals from the force sensor 9. Therefore, the reference inputs can be accurately calculated, and therefore the vehicle can move as the passenger intended.

Second Exemplary Embodiment

This exemplary embodiment is different from the first exemplary embodiment in the balanced position posture input. That is, the balanced position posture is dynamically changed in this exemplary embodiment. For example, when the vehicle 1 moves on an inclined surface or on a multilevel surface, the seat surface 8a is inclined according to the inclined surface or the like. Accordingly, the drive unit 5 is driven according to the inclined surface in this exemplary embodiment. In this example, the drive unit 5 is driven so that the seat surface is adjusted to or close to a horizontal state even on an inclined surface. Therefore, the operability is improved even when the vehicle is moving on an inclined surface or in a state where one of the wheels is located over a step. Note that the configuration and control other than this feature are similar to those of the first exemplary embodiment, and therefore their explanations are omitted.

Figure 8:
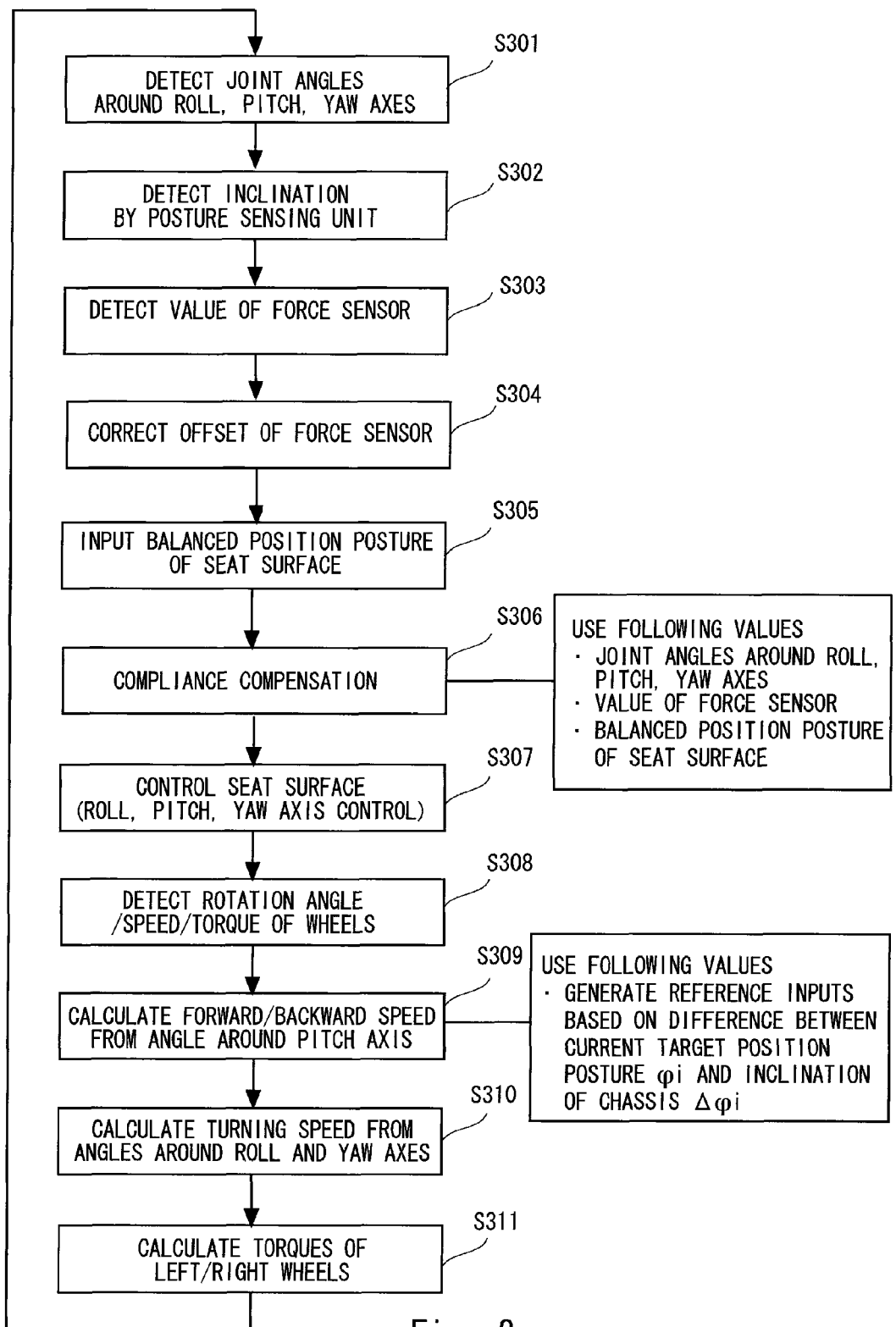
FIG. 8 is a flowchart showing control of a vehicle in accordance with a second exemplary embodiment.
Figure 9:
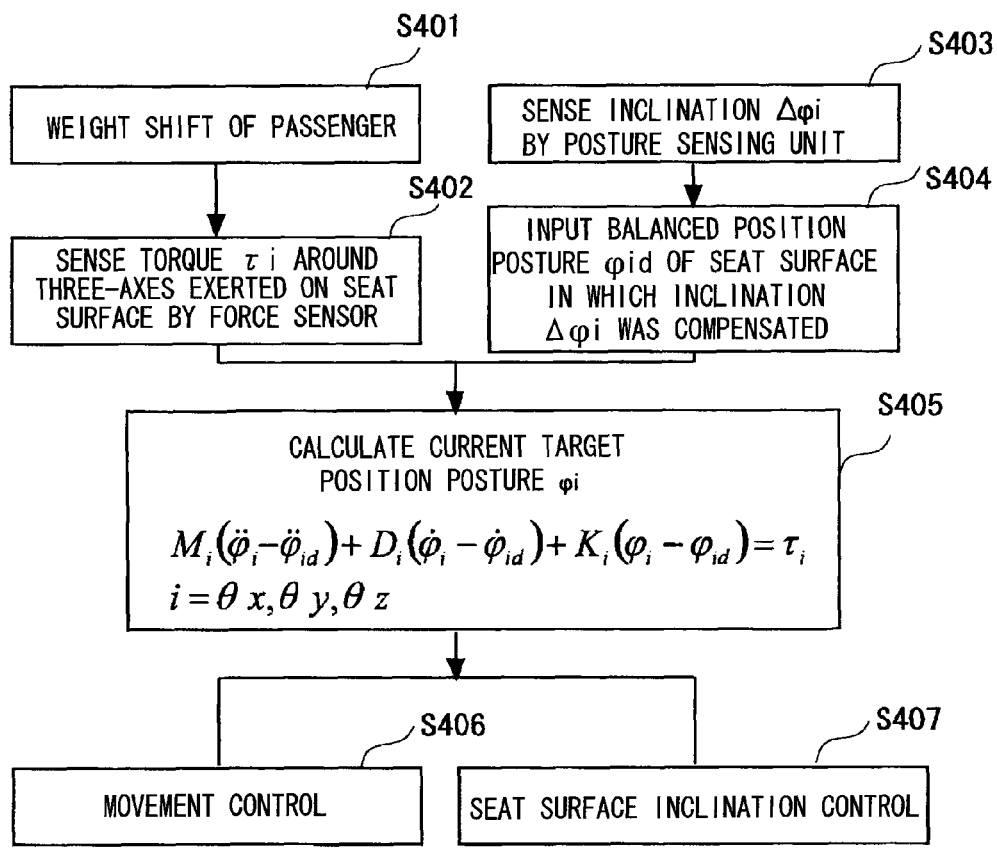
FIG. 9 is a flowchart showing compliance control in a vehicle in accordance with a second exemplary embodiment.
Figure 10:
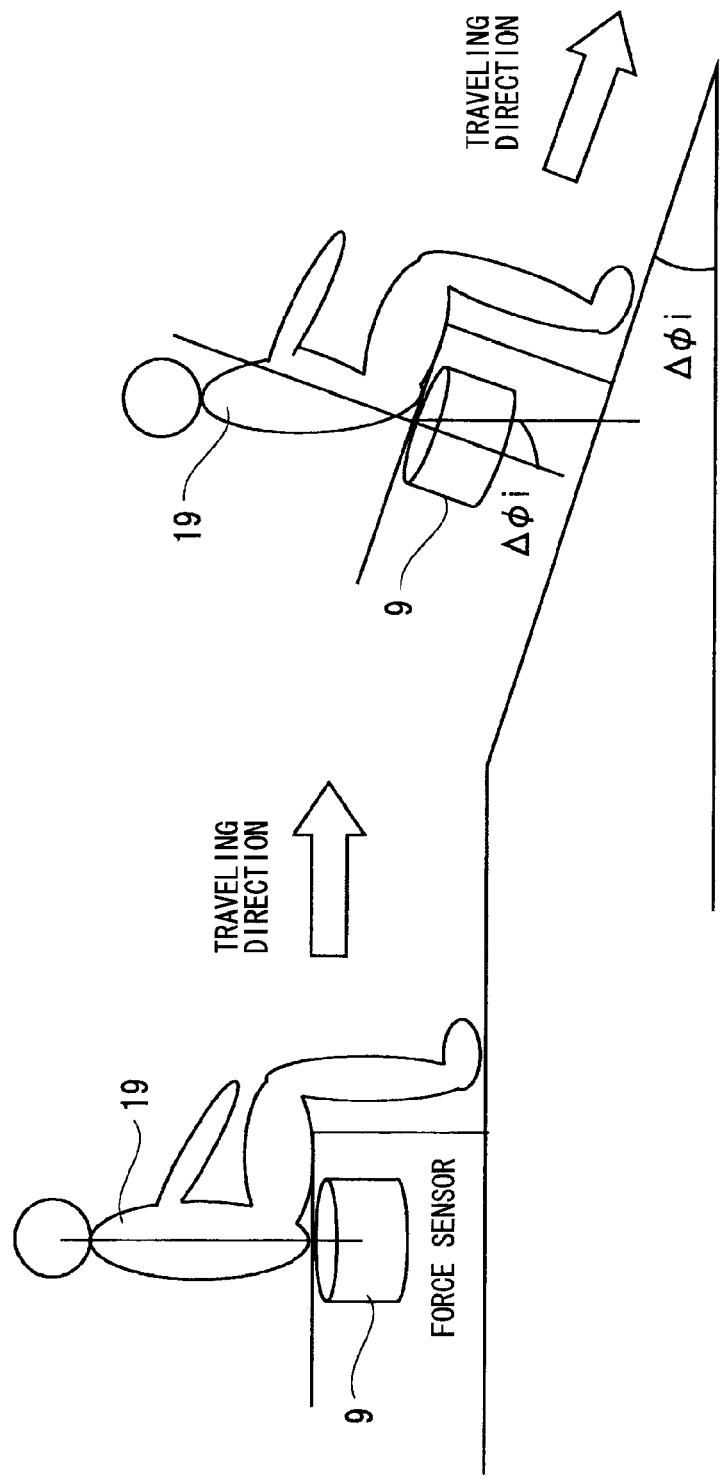
FIG. 10 is a diagram for explaining the posture of a vehicle when the vehicle moves on a downward slope.

A control method for a vehicle 1 in accordance with this exemplary embodiment is explained with reference to FIGS. 8 to 10. FIG. 8 is a flowchart corresponding to that of FIG. 6 shown in the first exemplary embodiment. FIG. 9 is a flowchart corresponding to that of FIG. 7 shown in the first exemplary embodiment. FIG. 10 is a side view showing the vehicle 1 as it is moving.

In this exemplary embodiment, the balanced position posture is changed according to the output of the posture sensing unit 4. That is, the posture sensing unit 4 detects the posture of the vehicle 1. Therefore, when the floor surface on which the vehicle 1 is moving is not flat, the output of the posture sensing unit 4 is changed. For example, as shown in FIG. 10, when the vehicle 1 moves from a flat surface to an inclined surface, the posture sensing unit 4 detects the posture change of the vehicle 1. Then, the balanced position posture is dynamically changed according to the posture change. Therefore, the joint angles in the balanced position posture are different between when the vehicle is moving on an inclined surface and when the vehicle is moving on a flat surface.

Therefore, firstly, as shown in FIG. 8, joint angles around the roll, pitch and yaw axes are detected as in the case of the first exemplary embodiment (step S301). Further, the posture sensing unit 4 detects an inclination (step S302). That is, the posture sensing unit 4 detects a posture change resulting from the floor surface. In this way, the inclination angle $\Delta\phi i$ of the inclined surface shown in FIG. 10 can be detected. Note that the steps S301 and S302 may be performed in parallel with each other. Then, similarly to the first exemplary embodiment, the detection of moment values by the force sensor (step S303) as well as the offset correction by the force sensor 9 (step S304) are performed.

After that, the balanced position posture φid of the seat surface is input (step S305). At this point, the balanced position posture φid has been changed according to the posture change detected by the posture sensing unit 4. That is, the balanced position posture φid in which the seat surface 8a becomes horizontal even when the vehicle is moving on the inclined surface is input. Therefore, the value of the balanced position posture φid is compensated by an amount equivalent to the inclination angle $\Delta\phi i$ of the inclined surface. The target joint angles are changed by an amount corresponding to the inclination of the floor surface. Further, if the posture sensing unit 4 is equipped with a three-axis gyroscopic sensor, the posture change around the roll, pitch and yaw axes are detected. In this case, the balanced position posture φθxd around the roll axis, the balanced position posture φθyd around the pitch axis, and the balanced position posture φθzd around the yaw axis are compensated. The drive unit 5 is controlled so that the seat surface 8a becomes parallel to the horizontal plane rather than to the inclined surface.

Then, the compliance compensation is performed (step S306). Similarly to the first exemplary embodiment, the joint angles around the roll, pitch and yaw axes, the moment values detected by the force sensor, and the balanced position posture φid of the seat surface are used. Needless to say, the balanced position posture φid of the seat surface 8a has been changed according to the floor surface. The seat surface 8a is controlled by using the compliance control (step S307). Similarly to the first exemplary embodiment, the motor provided for each axis is driven so that the yaw-axis mechanism 501, pitch-axis mechanism 502, and roll-axis mechanism 503 are adjusted to their respective target joint angles. As a result, the inclination of the seat surface 8a is changed and the current target position posture φi is thereby achieved.

Next, similarly to the first exemplary embodiment, the rotation angles, the speeds, and the torques of the wheels are detected (step S308). Then, the forward/backward movement speed of the vehicle 1 is calculated from the angle around the pitch axis (step S309). In this process, the control calculation unit 51 calculates the forward/backward movement speed based on a difference obtained by subtracting the inclination angle $\Delta\phi i$ of the inclined surface from the current target position posture φi. That is, the forward/backward movement speed is calculated based on the difference between the current target position posture φθy and $\Delta\phi\theta y$.

The turning speed of the vehicle 1 is calculated from the angles around the roll axis and the yaw axis (step S310). In this process, similarly to the step S309, the control calculation unit 51 calculates the turning speed based on the difference obtained by subtracting the inclination angle $\Delta\phi i$ of the inclined surface from the current target position posture φi. The turning speed is calculated based on the difference between the current target position posture φθx and $\Delta\phi\theta x$ and the difference between the current target position posture φθz and $\Delta\phi\theta z$. Then, the torques of the left and right rear wheels are calculated from the forward/backward movement speed and the turning speed. Note that the process in the step S311 is similar to that in the first exemplary embodiment, and therefore its explanation is omitted. As described above, reference inputs are calculated with consideration given to the inclination angle $\Delta\phi i$ of the inclined surface in this exemplary embodiment. Therefore, the operation amount can be accurately conveyed to the passenger even when the vehicle is moving on an inclined surface or in a state where one of the wheels is located over a step, or under similar circumstances. As a result, the passenger can easily recognize the operation amount. For example, when the passenger relaxes, the seat surface 8a returns to the balanced position and becomes horizontal.

Next, the compliance control in this exemplary embodiment is explained hereinafter. Firstly, as shown in FIG. 9, when the passenger shifts his/her body weight (step S401), the force sensor 9 senses a torque τi (step S402). These steps are similar to those of the first exemplary embodiment. The steps S403 and S404 may be performed in parallel with the steps S401 and S402.

The deviation of the posture angle of the vehicle 1 is detected. Further, the posture sensing unit 4 senses the inclination angle Δϕi of an inclined surface (step S403). Then, the balanced position posture ϕid in which the inclination angle Δϕi of the inclined surface is compensated is input (step S404). That is, joint angles at which a balanced position posture ϕid is achieved are stored in a memory or the like of the control calculation unit 51. At this point, the current target position posture ϕid has been changed according to the inclination angle Δϕi of the inclined surface. The current target position posture ϕid is set in such a manner that the seat surface 8a becomes horizontal even when the floor surface is inclined. In the balanced position posture ϕid, the joint angles are adjusted so that the seat surface 8a becomes horizontal.

After that, the current target position posture ϕi is calculated (step S405). The movement control is performed based on the current target position posture ϕi calculated in the step S405 (step S406). In this example, reference inputs for the left and right rear wheels 602 are calculated based on a difference obtained by subtracting the inclination angle Δϕi of the inclined surface from the current target position posture. Further, the inclination of the seat surface is also controlled based on the current target position posture ϕi (step S407). Note that the step S406 is similar to that of the first exemplary embodiment, and therefore its explanation is omitted.

In this exemplary embodiment, the balanced position posture ϕid is changed according to the output of the posture sensing unit 4. In this way, the passenger can easily grasp the operation amount. For example, when the passenger relaxes, the seat surface 8a returns to the balanced position posture. In this way, the operability can be improved. Further, since the seat surface 8a is brought to or close to a level state, the riding quality can be improved. The control calculation unit 51 calculates reference inputs used to drive the rear wheels 602 and the drive unit 5 based on the inclination angle Δϕi, the drive amount of the drive unit 5, the balanced position posture ϕid of the passenger seat 8, and the measurement signals from the force sensor 9. Accordingly, the reference inputs can be accurately calculated, and therefore the vehicle can move as the passenger intended.

Third Exemplary Embodiment

For the vehicle 1 shown in FIGS. 1 to 10, there may be a situation where the passenger cannot move the vehicle 1 as he/she intended. For example, when a passenger sits on the passenger seat, the posture change of the passenger is restricted by his/her thighs. Therefore, there is a possibility that the passenger can hardly take a forward-inclined posture in order to input a high-speed forward movement input. Further, when the passenger holds a piece of baggage, the input to the force sensor is changed. Furthermore, when the passenger adjusts his/her sitting position, the input to the force sensor could be also changed. In addition, when the vehicle moves on an inclined surface, the input to the force sensor could be deviated. Therefore, there is a possibility that the vehicle cannot move as the passenger intended. That is, there may be a situation in which, when the vehicle 1 is to be actually moved, the vehicle 1 cannot be moved as the passenger intended. Accordingly, in accordance with this exemplary embodiment, the vehicle can be moved as the passenger intended even in the situation like this, and therefore the operability can be further improved.

Figure 11:
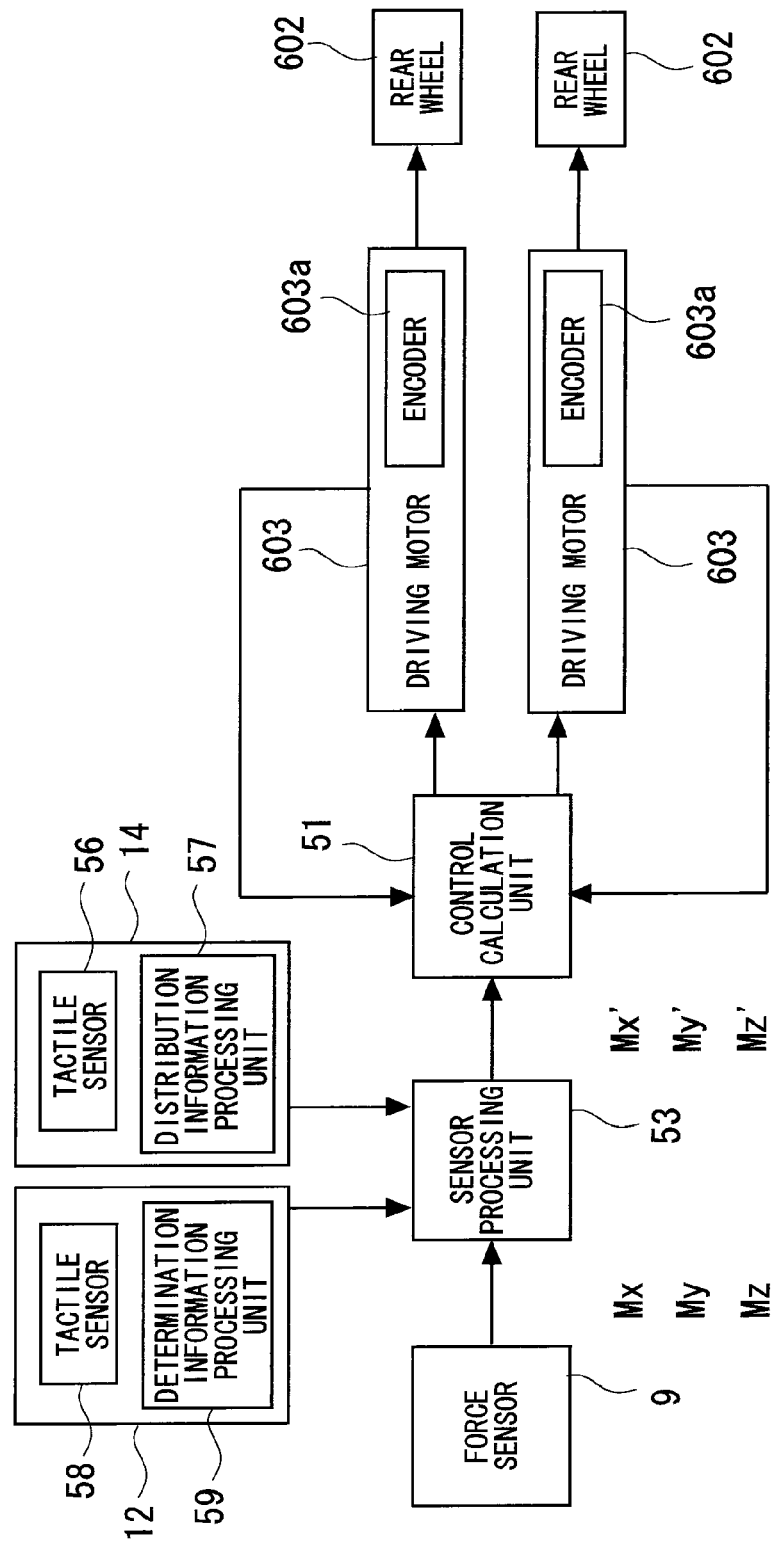
FIG. 11 is a block diagram showing a control system used to move a vehicle.

Next, a control system used to move the vehicle 1 in accordance with the third exemplary embodiment is explained with reference to FIG. 11. FIG. 11 is a block diagram showing a configuration of a control system used to move the vehicle 1. Firstly, the force sensor 9 detects a force exerted on the seat surface 8a. In this example, as described previously, the force sensor 9 outputs moments Mx, My and Mz, which are measurement signals, to the sensor processing unit 53. The sensor processing unit 53 performs processing on the measurement signals supplied from the force sensor 9. That is, it performs arithmetic processing on measured data corresponding to the measurement signals output from the force sensor 9. As a result, input moment values (Mx', My', Mz') to be input to the control calculation unit 51 are calculated. Note that the sensor processing unit 53 may be contained in the force sensor 9, or contained in the control calculation unit 51.

In this way, moments (Mx, My, Mz) measured by the force sensor 9 are converted into input moment values (Mx', My', Mz') around the respective axes. Then, the input moment values are used as input values used to operate the respective rear wheels 602. In this way, the sensor processing unit 53 calculates an input value for each axis. The magnitudes of the input moment values are determined according to the magnitudes of the moments. The signs of the input moment values are determined based on the signs of the measured moments. That is, when the moment is positive, the input moment value becomes a positive value, whereas when the moment is negative, the input moment value becomes a negative value. For example, when the moment Mx is positive, the input moment value Mx' becomes a positive value. Therefore, these input moment values become input values corresponding to the intended operation by the passenger.

The control calculation unit 51 performs control calculation based on the input moment values. In this way, reference inputs used to drive the driving motors 603 are calculated. Needless to say, the larger the input moment values are, the larger the reference inputs become. The reference inputs are output to the driving motors 603. Note that in this exemplary embodiment, since the left and right rear wheels 602 are the driving wheels, two driving motors 603 are illustrated in the figure. Further, one of the driving motors 603 rotates the right rear wheel 602 and the other of the driving motors 603 rotates the left rear wheel 602. The driving motors 603 rotate the rear wheels 602 based on the reference inputs. That is, the driving motors 603 provide reference torques used to rotate the rear wheels 602, which are the driving wheels. Needless to say, the driving motors 603 may provide rotation torques to the rear wheels 602 through a speed reducer or the like. For example, when reference torques are supplied from the control calculation unit 51 as reference inputs, the driving motors 603 rotate with those reference torques. As a result, the rear wheels 602 rotate so that the vehicle 1 moves to a desired direction at a desired speed. Needless to say, the reference inputs are not limited to the torques. That is, the reference input may be the rotation speed or the number of revolutions.

Further, an encoder 603a is provided inside each driving motor 603. These encoders 603a detect the rotation speeds of the driving motors 603 or the like. Then, the measured rotation speeds are input to the control calculation unit 51. The control calculation unit 51 performs feedback control based on the current rotation speeds and target rotation speeds. For example, a reference input is calculated by multiplying a difference between the target rotation speed and the current rotation speed by a proper feedback gain. Needless to say, the reference inputs supplied to the left and right driving motors 603 may be different from each other. That is, when the vehicle moves straight to the forward or backward direction, the left and right rear wheels 602 are controlled so that their rotation speeds become equal to each other. However, when the vehicle turns left or right, the left and right rear wheels 602 are controlled so that they rotate in the same direction but at different rotation speeds. Further, when the vehicle rotates on its own axis, the left and right rear wheels 602 are controlled so that they rotate in opposite directions.

For example, when the passenger takes a forward-inclined posture, a force is exerted on the passenger seat 8 in a direction around the pitch axis. As a result, the force sensor 9 detects +My moment (see FIG. 3). Based on this +My moment, the sensor processing unit 53 calculates an input moment value My' used to translate the vehicle 1. Similarly, the sensor processing unit 53 also calculates input moment values Mx' and Mz' based on Mx and Mz respectively. That is, the sensor processing unit 53 converts measured values into input moment values. These values are calculated independently of each other. That is, Mx' is determined based solely on Mx; My' is determined based solely on My; and Mz' is determined based solely on Mz. In this way, Mx', My' and Mz' are independent of each other.

The control calculation unit 51 calculates reference inputs based on the input moment values and the measured values of the encoders. As a result, the left and right rear wheels 602 rotate at a desired speed. Similarly, when the vehicle turns right, the passenger shifts his/her body weight to the right. As a result, a force is exerted on the passenger seat in a direction around the roll axis, and therefore the force sensor 9 detects +Mx moment. Based on this +Mx moment, the sensor processing unit 53 calculates an input moment value Mx' used to turn the vehicle 1 to the right. That is, a rudder angle corresponding to the direction to which the vehicle 1 moves is obtained. Then, the control calculation unit 51 calculates reference inputs according to the input moment value. The left and right rear wheels 602 rotate at different rotation speeds according to the reference inputs. That is, the left rear wheel 602 rotates at a higher rotation speed than that of the right rear wheel 602.

As described above, components for the translation movement in the forward/backward direction are obtained based on My'. That is, a driving torque or the like necessary to drive the left and right rear wheels 602 at the same rotation speed in the same direction is determined. Therefore, the larger the input moment value My', i.e., moment My is, the faster the vehicle 1 moves. The traveling direction, i.e., components for the rudder angle are obtained based on Mx'. That is, the difference between the rotational torques of the left and right rear wheels 602 is determined. Therefore, the larger the input moment value Mx', i.e., moment Mx is, the larger the difference between the rotation speeds of the left and right rear wheels 602 becomes.

Components for the rotation on its own axis are obtained based on Mz'. That is, components necessary to drive the left and right rear wheels 602 in opposite directions to rotate the vehicle on its own axis are obtained. Therefore, the larger the input moment value Mz', i.e., moment Mz is, the larger the rotation speeds in opposite directions of the left and right rear wheels 602 becomes. For example, when Mz' is positive, a driving torque or the like necessary to rotate the vehicle on its own axis in the counter-clockwise direction as viewed from the top is determined. That is, the right rear wheel 602 rotates forward and the left rear wheel 602 rotates backward at the same rotation speed.

Then, reference inputs used to drive the two rear wheels 602 are calculated by combining three components calculated based on the respective input moment values Mx', My' and Mz'. In this way, reference inputs for the respective left and right rear wheels 602 are calculated. A driving torque, a rotation speed, or the like is calculated as the reference input. That is, reference inputs for the left and right rear wheels 602 are calculated by combining values each calculated as one of the components corresponding to the input moment values Mx', My' and Mz'. In this way, the vehicle 1 moves based on the input moment values Mx', My' and Mz' calculated based on the measured moments Mx, My and Mz. That is, the traveling direction and the traveling speed of the vehicle 1 are determined based on the moments Mx, My and Mz that are generated by the weight shift of the passenger.

In this way, an inputting operation to move the vehicle 1 is performed by the action of the passenger. That is, when the passenger's posture is changed, a moment around each axis is detected. Then, the vehicle 1 moves based on the measured values of these moments. In this way, the passenger can easily operate the vehicle 1. That is, the operation using a joystick or a handle becomes unnecessary, thus making it possible to operate the vehicle by the weight shift alone. For example, when the passenger wants to move to the forward-right direction, the passenger shifts his/her body weight to the forward-right direction. Further, when the passenger wants to move to the backward-left direction, the passenger shifts his/her body weight to the backward-left direction. In this way, the position of the center of gravity of the passenger is changed, and an inputting operation according to that variation is thereby performed. That is, the moments corresponding to the shift of the center of gravity of the passenger are detected, so that the passenger can intuitively operate the vehicle. The control calculation unit 51 outputs reference inputs so that the vehicle moves forward or backward according to the sign of the input moment value at a traveling speed according to the absolute value of the input moment value.

Figure 12:
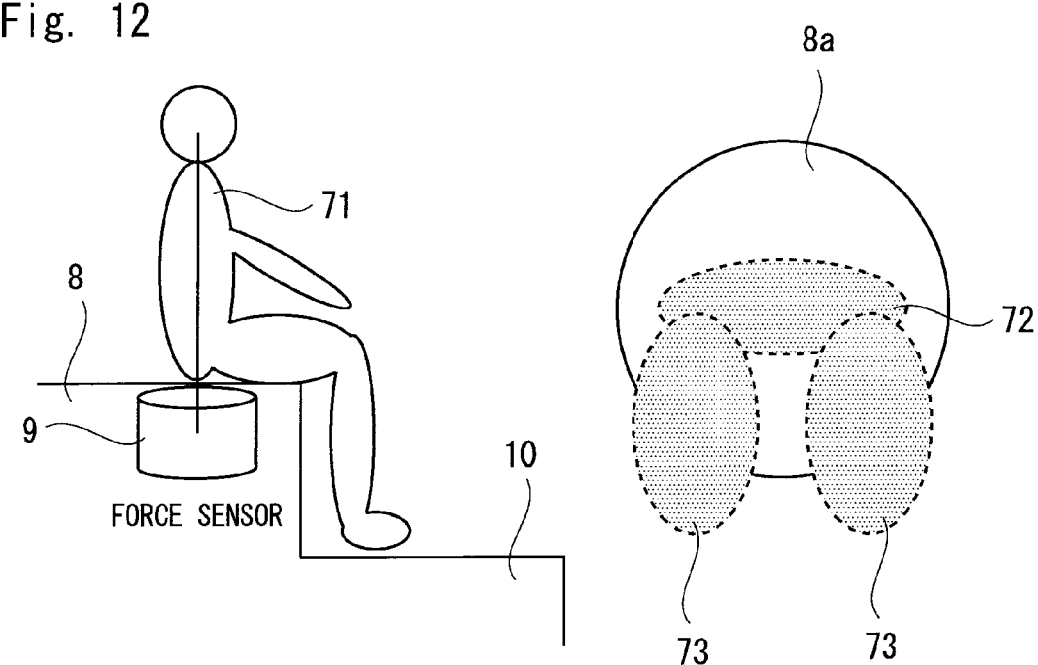
FIG. 12 shows a state where a passenger is on a passenger seat.
Figure 13:
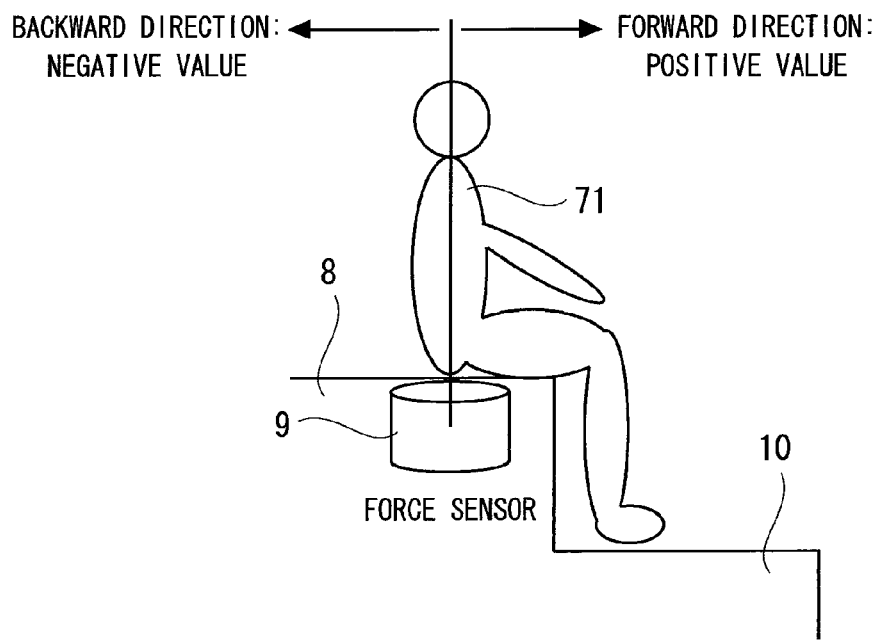
FIG. 13 shows the posture of a passenger and input directions.

For example, assume that a passenger 71 is on the passenger seat 8 equipped with the force sensor 9 as shown in FIG. 12. Note that FIG. 12 shows a state where the passenger 71 is on the passenger seat 8. In particular, the left part of the figure is a side view and the right side is a plane view of the seat surface 8a. In this case, the buttocks 72 and the thighs 73 of the passenger 71 are in contact with the seat surface 8a. An inputting operation in the forward-and-backward direction in this state is explained hereinafter. In this example, as shown in FIG. 13, the input to the forward direction is represented by a positive value and the input to the backward direction is represented by a negative value. That is, when My' is positive, the vehicle 1 moves forward, whereas when My' is negative, the vehicle 1 moves backward. Therefore, when My' is zero, the vehicle 1 stays at the current place and does not move forward or backward. That is, when the passenger 71 is in a neutral posture around the pitch axis, the vehicle 1 moves neither forward nor backward. The speed of the vehicle 1 is determined according to the absolute value of the input moment value My'. For example, the traveling speed changes in proportion to My'. In other words, the absolute value of the traveling speed monotonously increases with the increase of the absolute value of My'. In addition, when comparing a state where My' is +a (a is a given positive value) with a state where My' is −a, the magnitudes of the speeds of the vehicle 1 are equal but the directions of the speeds are opposite. As described above, the speed of the vehicle 1 is determined according to the inclination angle of the passenger's upper body with respect to the neutral posture. Therefore, the more the passenger bends his/her upper body, the higher speed the vehicle 1 moves at.

A determination signal is input from the determination unit 12 to the sensor processing unit 53. Tactile sensors 58 and a determination information processing unit 59 are provided in the determination unit 12. As described previously, the tactile sensors 58 are arranged in array on the upper surface of the footrest 10. Further, each tactile sensor 58 outputs a touch signal when an object is in contact with the upper surface of the tactile sensor 58. The determination information processing unit 59 performs processing based on these touch signals to determine whether a passenger is on the vehicle or not. That is, it determines whether soles are in contact with the footrest 10 or not based on the distribution of tactile sensors outputting touch signals. When the distribution of the tactile sensors outputting touch signals resembles soles in shape, it is determined that a passenger is on the vehicle. Further, if not so, it is determined that an object other than a human is in contact with the footrest 10.

Further, a position signal indicating the riding position is input from the riding position sensing unit 14 to the sensor processing unit 53. That is, the riding position sensing unit 14 outputs a position signal. The riding position sensing unit 14 includes tactile sensors 56 and a distribution information processing unit 57. The riding position sensing unit 14 includes a plurality of tactile sensors 58. The plurality of the tactile sensors 56 are arranged in array. Further, each tactile sensor 56 outputs a touch signal when an object is in contact with the upper surface of the tactile sensor 56. The distribution information processing unit 57 performs processing based on information about the distribution of these touch signals to calculate the riding position. A position signal is input to the sensor processing unit 53. The sensor processing unit 53 performs processing according to the position signal.

The sensor processing unit 53 changes its processing according to the determination signal and the position signal. Note that the details of this processing are explained later. That is, this processing is different from one embodiment to another in the following third to ninth exemplary embodiments. Exemplary embodiments with regard to the control of the vehicle shown in FIGS. 1 to 3 and 11 are explained hereinafter. That is, the following third to ninth exemplary embodiments are exemplary embodiments with regard to the vehicle 1 having a configuration shown in FIGS. 1 to 3 and 11.

Note that similarly to the control calculation unit 51, each of the sensor processing unit 53, the distribution information processing unit 57, the determination information processing unit 59, and the like is composed of a CPU, a RAM, and the like. Further, it performs arithmetic processing according to a certain program. Needless to say, each of these processing units as well as the control calculation unit 51 may have the same physical configuration. That is, various processing and calculation steps may be performed in a single arithmetic processing circuit.

As described previously, the traveling speed is determined according to the posture of the passenger. Therefore, when the passenger wants to move forward at a high speed, the passenger needs to incline his/her posture forward extensively. However, as shown in FIG. 12, since the thighs 73 are in contact with the seat surface 8a, the movement of the thighs 73 is restricted by the shape of the seat surface 8a. As a result, it is very difficult to increase the moment My. That is, when the moment My is positive, it is very difficult to increase its absolute value in comparison to when the moment My is negative. Therefore, the sensor processing unit 53 performs the following processing in this exemplary embodiment.

In this exemplary embodiment, the coefficient used to calculate My' from My is changed depending on the sign of My. That is, when My is positive, the coefficient is made larger than when My is negative. In this way, it is possible to make the value of My' larger when My is a positive value. For example, the coefficient by which My is multiplied is changed depending on whether My is a positive value or a negative value in the conversion formula to convert My into My'. As a result, even when My has the equal absolute value, the absolute value of My' is changed depending on the sign of My. In this way, even when the forward inclination angle of the posture of the passenger 71 is small, the input moment value becomes larger. The forward traveling speed can be made larger. Therefore, since the passenger 71 does not need to bend forward extensively, the operability can be improved. Further, since the passenger does not need to bend forward extensively, the passenger does not take such a posture in which the passenger cannot easily look forward. Therefore, the safety can be improved even when the vehicle moves forward at a high speed.

Figure 14:
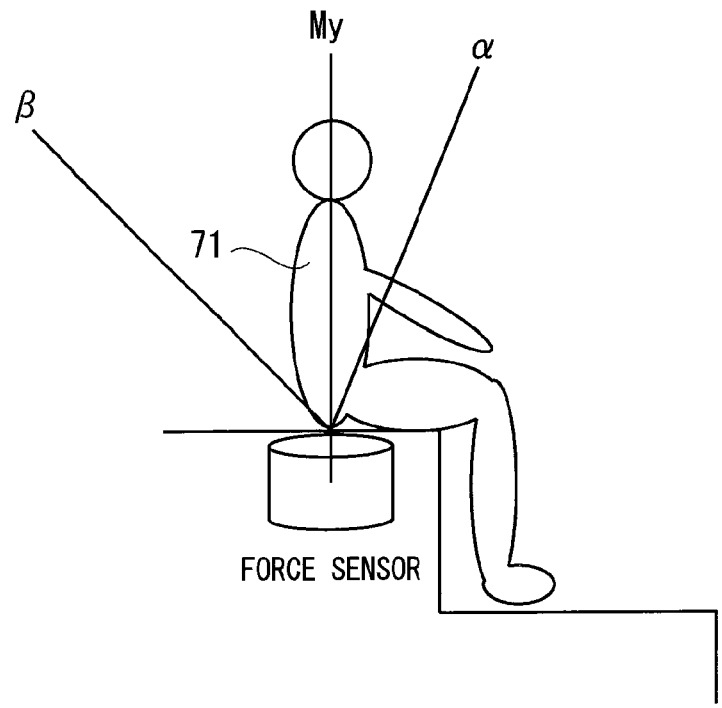
FIG. 14 is a side view for explaining the posture of a passenger and an input moment value in a third exemplary embodiment.
Figure 15:
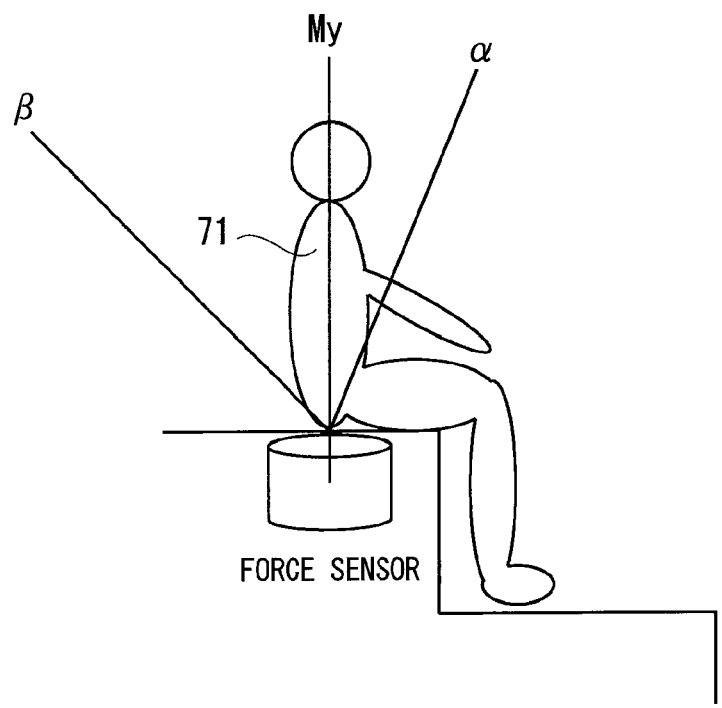
FIG. 15 is a side view for explaining the posture of a passenger and an input moment value in a fourth exemplary embodiment.

For example, as shown in FIG. 14, when the passenger inclines his/her posture by a forward-inclined angle α (α is a positive angle), the magnitude of the speed becomes equal to that of the speed obtained when the passenger inclines his/her posture by a backward-inclined angle β (β>α). Note that FIG. 14 is a side view for explaining the posture of a passenger and the input moment value. Even when the forward-inclined angle α of the passenger 71 is small, it is possible to increase the input moment value My'. In this way, the forward traveling speed can be made faster, and therefore the control can be performed according to the intention of the passenger 71. In this exemplary embodiment, when the passenger is in a neutral posture, i.e., when the passenger is on the vehicle in a posture along the vertical direction, no forward movement input is made. Further, the processing can be easily performed by performing processing on the input moment value My' to be input to the control calculation unit 51. That is, the complicated control calculation to obtain reference inputs can be performed without considering whether the input is for the forward movement or for the backward movement. Therefore, the control can be easily performed. Further, the vehicle 1 in accordance with the third exemplary embodiment does not use the posture sensing unit 4, the determination unit 12, and the riding position sensing unit 14. Therefore, the provision of them is not indispensable in this exemplary embodiment.

Fourth Exemplary Embodiment

In this exemplary embodiment, the sensor processing unit 53 performs processing to increase the input moment value My' for the forward movement input as in the case of the third exemplary embodiment. In this exemplary embodiment, the position of the origin is shifted backward when the input moment value My' is calculated from the moment My. That is, while the yaw axis of the moment My measured in the force sensor 9 is located at the center of the force sensor 9, the position of the yaw axis that is used when the input moment value My' is calculated is shifted backward from the center of the force sensor 9. In this way, an offset value is given to the position of the yaw axis for the input moment value My'. In this exemplary embodiment, the position of the yaw axis is shifted backward in comparison to the position of the yaw axis shown in FIGS. 13 and 14. In this way, when comparing two states where the moments My take on a positive value and a negative value respectively but have the same absolute value, the absolute value of the input moment value My' converted from the positive moment My is larger than that of the input moment value My' converted from the negative moment My. Therefore, the input moment value My' can be made larger when the moment My is a positive value.

Figure 16:
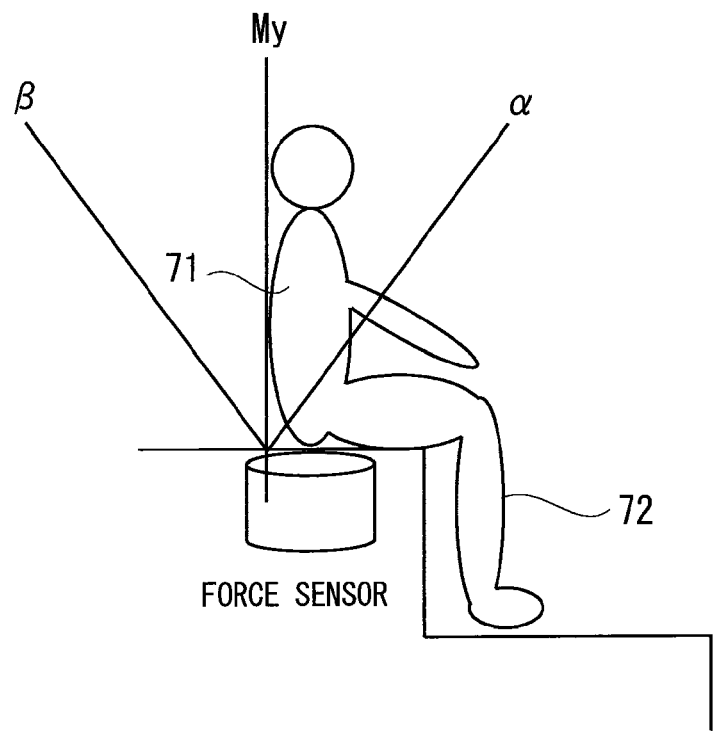
FIG. 16 is a side view for explaining the posture of a passenger and an input moment value in a fourth exemplary embodiment.

Even if the passenger wants to accelerate to the same speed in the forward and backward movements, the passenger cannot easily take a forward-inclined posture because the movement of the thighs 73 is restricted by the seat surface 8a. Therefore, if the passenger intends to move forward at the same speed as the speed of the backward movement, the forward-inclined angle α could become smaller than the backward-inclined angle β. That is, although the passenger thinks that he/she is bending at the same angle as the backward-inclined angle, the forward-inclined angle α could become smaller because the movement of the thighs 73 is restricted by the seat surface 8a. As a result, if there is no offset is given to the position of the origin, the speed of the forward movement could become lower than the intended speed. That is, under original conditions, the input moment values My' do not have the same absolute value, unless the backward-inclined angle β and the forward-inclined angle α are equal to each other. Therefore, in this exemplary embodiment, an offset is given to the position of the origin, i.e., to the position of the yaw axis as shown in FIG. 16. That is, an imaginary forward-inclined angle α is created by giving an offset. The imaginary forward-inclined angle α is larger than the real forward-inclined angle. Therefore, the forward traveling speed can be increased as the passenger intended.

For example, assuming that the position of the origin is −2, when the moment My is a positive value, the output is added by 2. Further, when the moment My is a negative value, the output is reduced by 2. In this way, the input moment value is increased by shifting the position of the yaw axis backward in the calculation. To perform the processing like this, an offset voltage is given to the output voltage from the force sensor 9. Assuming that a positive voltage is output from the force sensor 9 in the forward-inclined state and a negative voltage is output in the backward-inclined state, the reference potential is set to a negative potential so that a positive voltage is increased. As a specific example, assume a case where the force sensor 9 outputs voltages ranging from −5V to +5V. That is, the moment My is expressed by voltages from −5V to +5V. Assuming that a positive voltage is output in the forward-inclined state and a negative voltage is output in the backward-inclined state, the reference voltage is set at −2V in the sensor processing unit 53. In this case, the offset voltage becomes −2V. As a result, when the output voltage from the force sensor 9 is in a range from −2V to 5V, it becomes a forward movement input. Thus, the actual input moment value My' is calculated from moments My ranging from 0V to 7V. Therefore, for the forward movement input, the input moment value can be made larger than the moment My output from the force sensor 9.

After an offset value is given to the measured moment output from the force sensor 9 in this manner, the input moment value is calculated. As a result, the forward movement operation can be easily performed as in the case of the third exemplary embodiment. Needless to say, an offset voltage may be given to the force sensor 9 itself. Even when the forward inclination angle of the posture of the passenger 71 is small, the forward traveling speed can be made larger. Therefore, since the passenger 71 does not need to bend forward extensively, the operability can be improved. Further, since the passenger does not need to bend forward extensively, the passenger does not take such a posture in which the passenger cannot easily look forward. Therefore, the safety can be improved even when the vehicle moves forward at a high speed.

In this exemplary embodiment, when the passenger is in a neutral posture, i.e., when the passenger is on the vehicle in a posture along the vertical direction, a forward movement input is made. Further, the vehicle 1 in accordance with the fourth exemplary embodiment does not use the posture sensing unit 4, the determination unit 12, and the riding position sensing unit 14. Therefore, the provision of them is not indispensable in this exemplary embodiment. Furthermore, this exemplary embodiment may be combined with the third exemplary embodiment.

As described above, in the third and fourth exemplary embodiments, the relation between the moment My and the input moment value My' is changed between when the moment My is a positive value and when the moment My is a negative value. In a comparison between a state where the passenger 71 takes a forward-inclined posture to input a forward movement and a state where the passenger 71 takes a backward-inclined posture to input a backward movement, if the absolute values of the moments My are the same in both states, the absolute value of the input moment value My' in the forward traveling state becomes larger than that in the backward traveling state. Therefore, the forward movement operation can be easily performed. That is, it is possible to make the forward traveling speed larger without having the passenger bend forward extensively. Therefore, the vehicle can move as the passenger intended.

Fifth Exemplary Embodiment

This exemplary embodiment uses the control in accordance with the third or fourth exemplary embodiment. In this exemplary embodiment, the coefficient used in the third exemplary embodiment is changed according to the situation. That is, in the calculation to obtain an input moment value My' from a moment My, the coefficient by which the moment My is multiplied is changed according to the situation. Specifically, the coefficient is changed depending on whether a passenger is on the vehicle or not. Alternatively, the offset value is set to zero depending on whether a passenger is on the vehicle or not.

Figure 17:
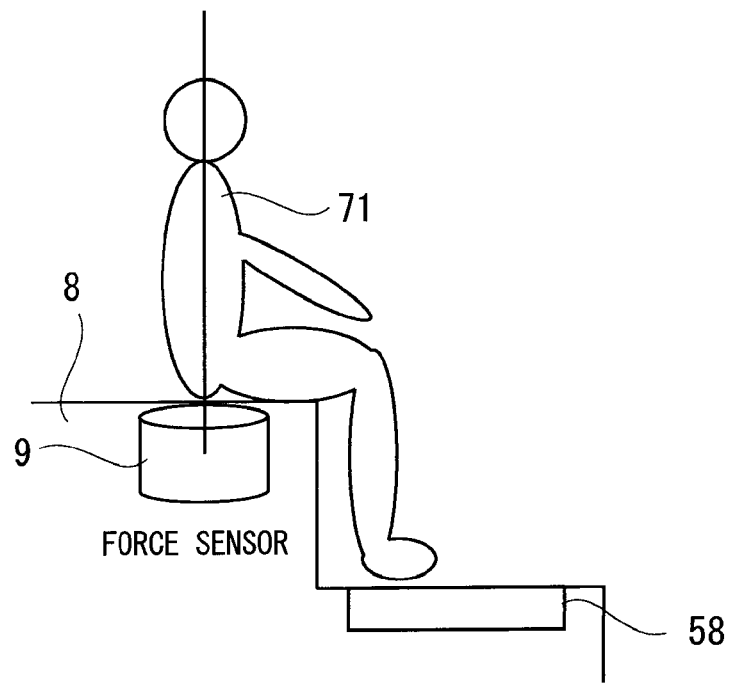
FIG. 17 is a side view schematically showing a configuration of a footrest used in a vehicle in accordance with a fifth exemplary embodiment.

In this exemplary embodiment, the determination unit 12 determines whether a passenger is on the vehicle or not. For example, as shown in FIG. 17, tactile sensors 58 are provided in the footrest 10. The tactile sensors 58 are arranged in array on the surface of the footrest 10. Therefore, the shape of an object that is in contact with the footrest 10 is recognized based on the distribution of tactile sensors 58 outputting touch signals. When an object in contact with the footrest 10 resembles typical soles in shape and there are two soles, it is determined that a passenger 71 is on the vehicle. In contrast to this, when an object in contact with the footrest 10 is significantly different from typical soles in shape, it is determined that no passenger is on the vehicle. In this way, the presence/absence of a passenger can easily and reliably determined by providing tactile sensors 58 in the footrest 10.

When a passenger is on the vehicle, the movement of the thighs 73 of the passenger is restricted by the seat surface 8a. Therefore, as shown in the third and fourth exemplary embodiments, an input moment value for a forward movement input is increased. In contrast to this, when no passenger is on the vehicle, the control shown in the third or fourth exemplary embodiment is not performed. That is, when the absolute values of the moments My are the same, the input moment values My' have the same absolute value. By doing so, the vehicle can move as the user intended. That is, even when the vehicle 1 is operated with no passenger 71 on the vehicle, the vehicle 1 can move at the intended speed.

For example, a passenger stands on the floor surface and puts his/her hand on the seat surface 8a. Alternatively, a passenger puts an object he/she wants to transport on the seat surface 8a and puts his/her hand on the object. Then, by applying a force with the hand to a direction to which he/she wants to move the vehicle 1, the vehicle 1 moves to that direction. In such a case, since the passenger is not on the passenger seat 8, the passenger is not restricted because of his/her thighs 73. Therefore, the passenger can apply a force without any restriction. That is, since the passenger can apply a force to every direction in a similar fashion, there is no substantial difference in the forward movement input and the backward movement input. The offset is set to zero in both forward traveling state and backward traveling state. Alternatively, the coefficient is set to the same value. In this way, the vehicle can move at a speed the passenger intended. On the other hand, when a passenger 71 is on the passenger seat 8, the forward movement input is made larger than the backward movement input. In this way, it is possible to move the vehicle as the passenger intended.

Figure 18:
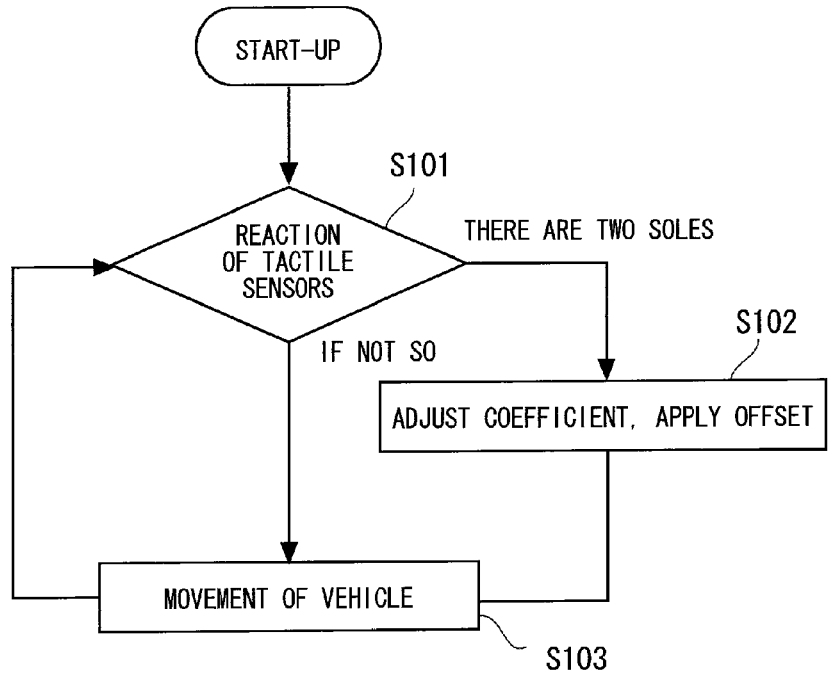
FIG. 18 is a flowchart showing a control method for a vehicle in accordance with a fifth exemplary embodiment.

Next, a control method for the vehicle 1 in accordance with this exemplary embodiment is explained with reference to FIG. 18. FIG. 18 is a flowchart showing a control method in accordance with this exemplary embodiment. After starting up the vehicle 1, the reaction of the tactile sensors is checked (step S101). That is, whether any object is in contact with the tactile sensors 58 arranged in array or not is determined. Then, the determination information processing unit 59 determines whether a passenger is on the vehicle or not. In this example, when there are two soles, it is determined that a passenger is on the vehicle. As a result, the vehicle enters a riding mode. When the vehicle enters the riding mode, the coefficient adjustment and/or the offset position is applied (step S102). As a result, reference inputs in which the coefficient adjustment and/or the offset are taken into account are calculated. Then, the vehicle is operated based on these reference inputs (step S103). If not so, the vehicle enters a non-riding mode. In the case of the non-riding mode, the vehicle is operated without applying the coefficient adjustment and the offset setting (step S103). That is, the same coefficient is used for the positive and negative values. Alternatively, the offset value is set to zero. In this way, it is possible to move the vehicle as the passenger intended irrespective of the presence/absence of the passenger. Accordingly, the vehicle can move as the passenger 71 intended, and therefore the operability can be improved. Note that in the control method in accordance with the third and fourth exemplary embodiments, the step S101 is eliminated and the steps S102 and S103 are repeatedly performed.

Further, the determination unit 12 that determines whether a passenger 71 is on the vehicle or not is not limited to any particular configurations. For example, tactile sensors 58 may be disposed on the passenger seat 8. That is, a plurality of tactile sensors 58 are arranged in array on the seat surface 8a. Then, the presence/absence of a passenger can be determined based on whether the distribution of tactile sensors 58 outputting touch signals resembles a shape of the combination of buttocks and thighs or not. Further, instead of or in addition to the tactile sensors 58, a camera may be used for the determination. For example, the presence/absence of a passenger can be determined by recognizing the face of the passenger with a camera. Further, the weight of the object placed on the passenger seat may be measured by the force sensor 9. Then, when the weight of the placed object is substantially equal to the weight of a human, it is determined that a passenger is on the vehicle.

Needless to say, the presence/absence of a passenger may be determined by combining two or more of the above-described techniques. For example, it is possible to combine the weight of the placed object measured by the force sensor 9 with the shape of soles recognized by the tactile sensors 58. Then, only when both conditions for the presence of a passenger on the vehicle are satisfied, it is determined that the passenger is on the vehicle. That is, if at least one of the conditions for the presence of a passenger on the vehicle is not satisfied, it is determined that no passenger is on the vehicle. In this way, it is possible to reliably determine the presence/absence of a passenger, and thereby to accurately switch the vehicle between the riding mode and the non-riding mode. Further, any technique capable of determining a situation that a human is obviously on the vehicle may be used. Examples of the technique include a technique to measure the shape of buttocks with tactile sensors 58 provided on the seat surface 8a and a technique of detect the face and/or body of a human with a built-in camera. By determining the presence/absence of a passenger with one or more of these various sensors in this manner, it is possible to perform the optimal control without making the passenger aware of it. Needless to say, it is also possible to provide a switch used to indicate that a passenger is on the vehicle, and the determination is thereby made by the passenger by operating the switch. Note that this exemplary embodiment does not use the riding position sensing unit 14 and the posture sensing unit 4. Therefore, the riding position sensing unit 14 and the posture sensing unit 4 are not indispensable to the vehicle 1 in this exemplary embodiment.

Sixth Exemplary Embodiment

In this exemplary embodiment, an offset is given to the output from the force sensor 9 as in the case of the fourth exemplary embodiment. That is, an offset voltage is set for measurement signals output from the force sensor 9. Further, an offset value is also set for the moment Mx as well as the moment My in this exemplary embodiment. Then, the offset value is optimized according to the situation.

Figure 19:
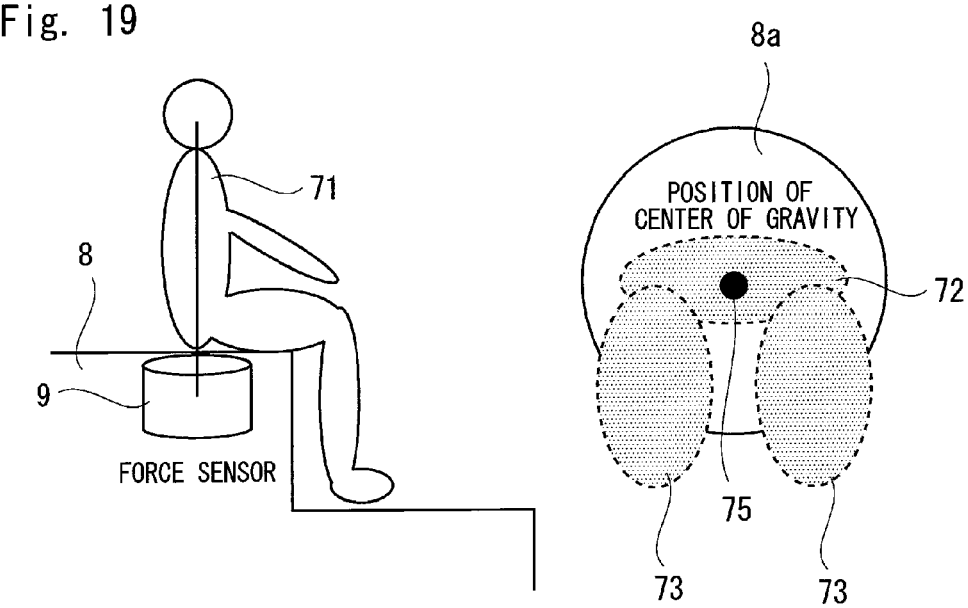
FIG. 19 shows a position of the center of gravity in a state where a passenger does not hold any baggage.
Figure 20:
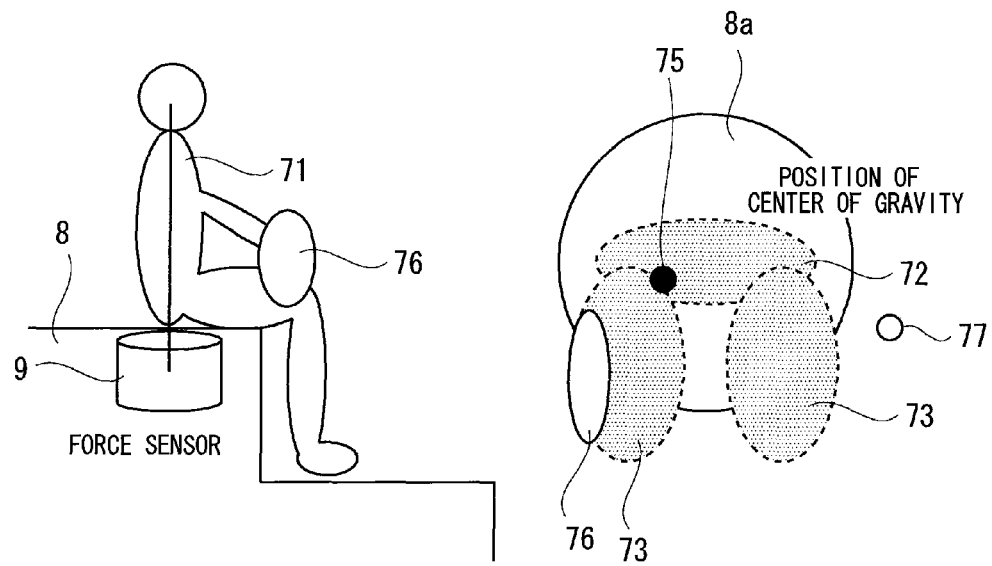
FIG. 20 shows a position of the center of gravity in a state where a passenger holds a baggage.

Assume a case where the passenger 71 grasps a piece of baggage. For example, a situation where the passenger first holds no baggage and then holds a piece of baggage is explained with reference to FIGS. 19 and 20. FIG. 19 shows a state where the passenger 71 holding no baggage is on the vehicle, and FIG. 20 shows a state where the passenger 71 holding a piece of baggage 76 is on the vehicle. Assume that the position of the center of gravity 75 of the passenger 71 is located at the center of the seat surface 8a when passenger 71 sits on the passenger seat 8 without holding any baggage. In this state, when the passenger grasps the baggage 76, the position of the center of gravity 75 is moved from the center of the seat surface 8a. For example, when the passenger holds the baggage 76 with the left hand, the position of the center of gravity 75 is displaced to the left. In this way, the position of the center of gravity is shifted to the side on which the passenger holds the baggage 76. Therefore, when the passenger wants to move straight, the passenger needs to incline his/her posture to an obliquely left or right direction. Therefore, when the position of the center of gravity 75 is displaced, the performance of the intended operation becomes difficult. That is, the direction from the origin to the position of the center of gravity 75 is inclined with respect to the vertical direction. Therefore, even when the passenger 71 maintains the neutral posture, moments Mx and My corresponding to the baggage 76 are detected.

To cancel the moments Mx and My caused by the baggage 76, an offset is set to the output of the force sensor 9. In this way, it is possible to move the vehicle as the passenger intended irrespective of the weight of the baggage 76. Specifically, an on-board weight on the passenger seat 8 is measured by the force sensor 9. Then, when the on-board weight is changed, an offset is reset to a different value. In this way, it is possible to move the vehicle as the passenger 71 intended irrespective of the presence/absence of the baggage 76. That is, in the state where the passenger 71 is holding baggage, when the passenger 71 wants to move straight, the passenger 71 takes a forward-inclined posture. Similarly, in the state where the passenger 71 is holding no baggage, when the passenger 71 wants to move straight, the passenger 71 takes a forward-inclined posture. When the passenger performs the same operation, the vehicle 1 performs the same action. Accordingly, the vehicle can move as the passenger intended, and therefore the operability can be improved.

Figure 21:
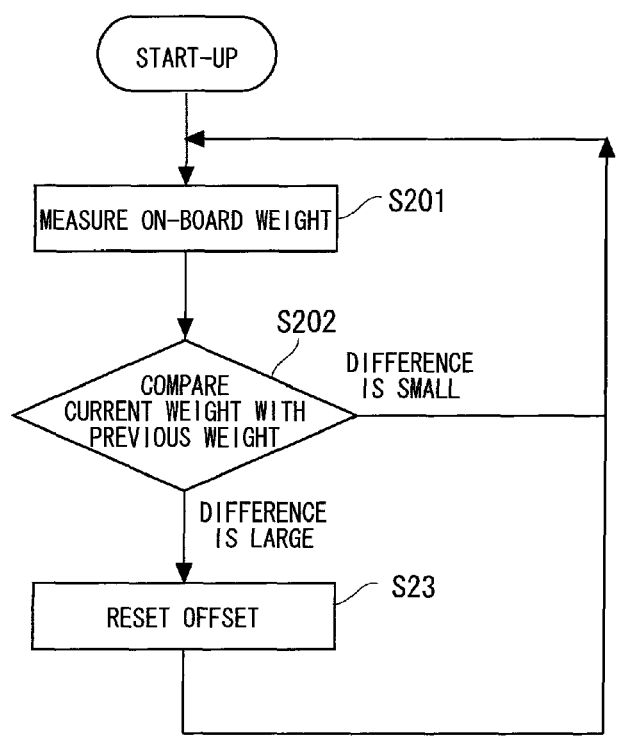
FIG. 21 is a flowchart showing a control method for a vehicle in accordance with a sixth exemplary embodiment.

Next, a control method for the vehicle 1 in accordance with this exemplary embodiment is explained with reference to FIG. 21. FIG. 21 is a flowchart showing a control method of the vehicle 1 in accordance with this exemplary embodiment. After starting up the vehicle 1, an on-board weight on the passenger seat 8 is measured by the force sensor 9 (step S201). Then, the weight obtained in this measurement is compared with the weight obtained in the previous measurement (step S202). When the difference between the weight in the current measurement and the weight in the previous measurement is greater than a threshold, the offset is reset to a different value (step S203). In this case, reference inputs are calculated by using the offset reset. Then, the process returns to the step S201 in which an on-board weight is measured. On the other hand, when the difference between the current weight and the previous weight is smaller than the threshold, reference inputs are calculated without changing the offset. Then, the process returns to the step S201 in which an on-board weight is measured. Further, after the comparison in the step S202, the previous weight is replaced by the current weight. In this way, the resetting of the offset can be easily performed.

The offset is set to a value corresponding to the moments Mx and My generated when the weight change occurs. When the offset is to be reset, an output voltage corresponding to the moments Mx and My measured by the force sensor 9 is defined as the offset voltage. An output voltage corresponding to the moments measured when the weight change occurs is used as the reference. That is, an output voltage output at the timing when the weight change occurs becomes the offset voltage. After the offset voltage is updated, input moment values are calculated based on a difference between the output voltage corresponding to the moments measured at the time of the occurrence of weight change and an output voltage corresponding to moments measured after the occurrence of weight change. For example, assume that the voltages corresponding to the moments Mx and My are 1V and 2V respectively when a weight change occurs. These voltages defined as offset voltages. In this case, the output voltage corresponding to the moment Mx measured after this offset-voltage setting is reduced by 1V. Similarly, the output voltage corresponding to the moment My is reduced by 2V. Then, after the subtraction of the offset voltages, input moment values are calculated. In other words, differences between moments generated at the time of the offset setting and moments generated by a posture change are converted into input moment values. Reference inputs are calculated based on the differences. The vehicle can be controlled in the same fashion by the same driving method irrespective of whether the passenger is holding the baggage 76 or not.

With the configuration like this, the offset is also set at the timing when the passenger 71 adjusts his/her sitting position. That is, when the passenger 71 adjusts his/her sitting position, the buttocks come off the seat surface 8a. As a result, the force exerted on the seat surface 8a is temporarily weakened, and therefore a weight change is detected. That is, the change of the weight exceeds a threshold. Then, the offset setting is performed at this timing. By doing so, the passenger can operate the vehicle without being conscious that the passenger holds the baggage 76. Therefore, the operability can be improved. As described above, the offset setting is performed at the timing when the on-board weight on the riding portion 3 is changed. In this example, the measurement result of the force sensor 9 at the timing when the on-board weight is changed is used as a reference offset value. Further, the on-board weight is calculated based on the measured value from the force sensor 9.

Note that although the offset setting is performed in response to the weight change in the above explanation, the timing at which the offset setting is performed is not limited to this timing. For example, a switch for offset setting may be provided in the vehicle 1, and the offset setting may be performed by switching this switch. For example, a switch 77 may be disposed near the riding portion 3 as shown in FIG. 20. The offset setting is performed at the timing when the passenger turns on the select switch. In this way, a similar advantageous effect can be achieved. Further, the reset of the offset value is also performed when the passenger passes the baggage from one hand to the other hand without taking both hands off the baggage at the same time.

It is also possible to monitor the motion of the passenger with a camera to determine whether the passenger holds baggage or not. Note that this exemplary embodiment does not use the determination unit 12, the riding position sensing unit 14, and the posture sensing unit 4. Therefore, the determination unit 12, the riding position sensing unit 14, and the posture sensing unit 4 are not indispensable to the vehicle 1 in this exemplary embodiment. Needless to say, the on-board weight may be detected by using a sensor other than the force sensor 9. The use of the force sensor 9 for the detection of the on-board weight eliminates the need of an additional sensor.

Seventh Exemplary Embodiment

In this exemplary embodiment, an offset is given according to distribution information supplied from the riding position sensing unit 14 shown in FIG. 11. That is, an offset is given according to the sitting position of the passenger. Note that the way of giving an offset to the moments Mx and My is similar to that in the fourth and sixth exemplary embodiments and the like, and therefore its explanation is omitted. That is, the reference potential for the output from the force sensor 9 is adjusted.

Figure 22:
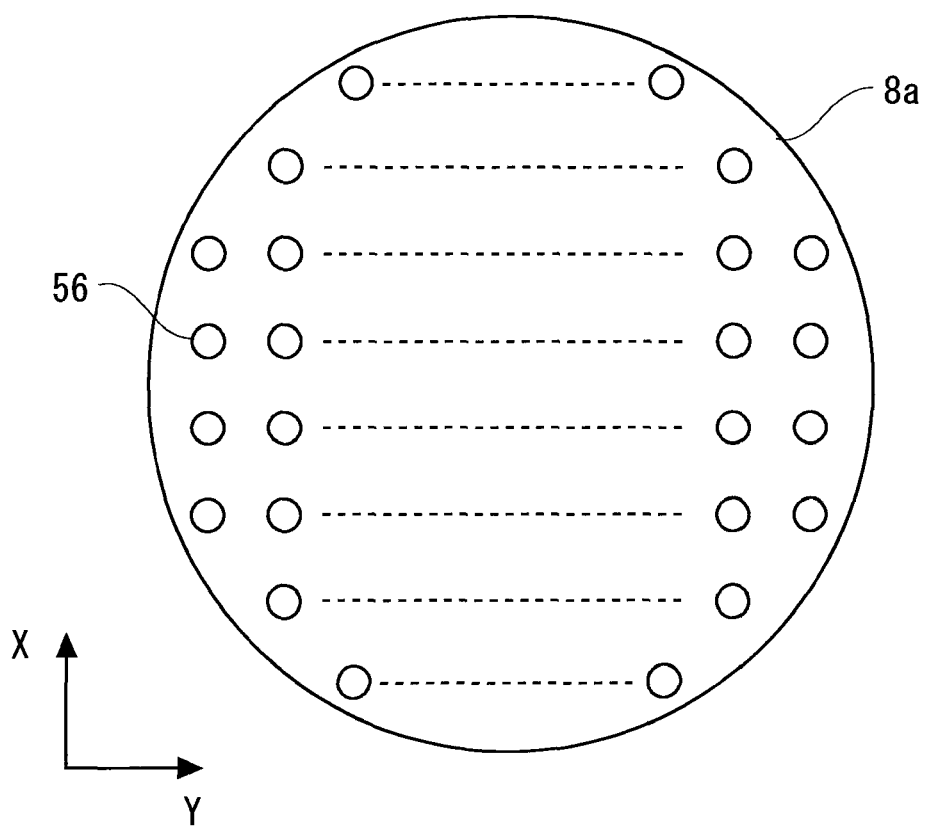
FIG. 22 is a top view showing a configuration of a tactile sensor provided on a seat surface.
Figure 23A:
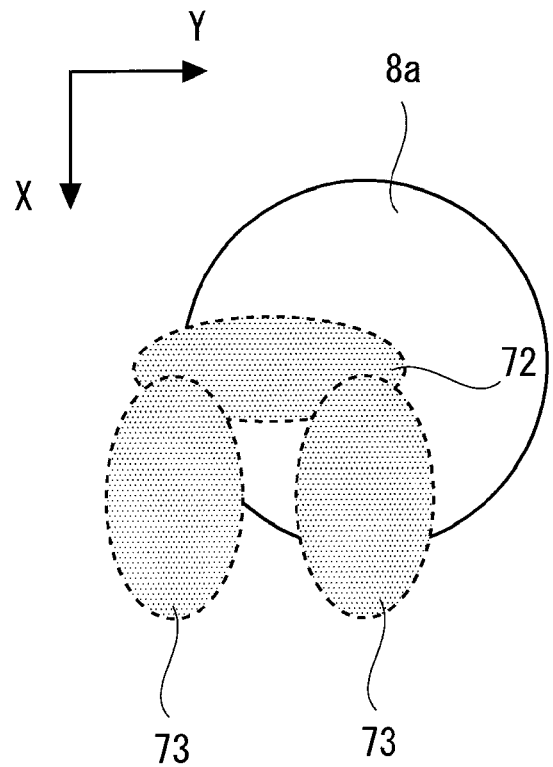
FIG. 23A is a top view showing a deviation of a riding position on a seat surface.
Figure 23B:
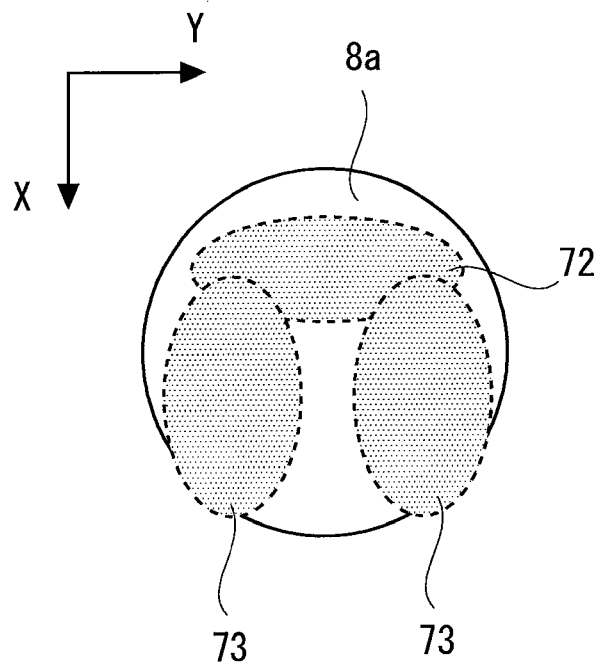
FIG. 23B is a top view showing a deviation of a riding position on a seat surface.
Figure 23C:
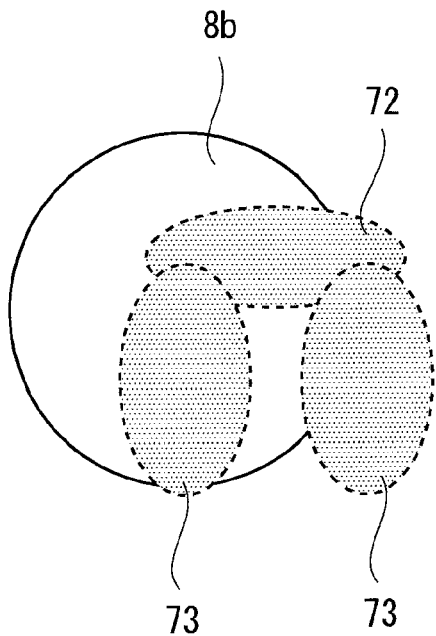
FIG. 23C is a top view showing a deviation of a riding position on a seat surface.

Firstly, a configuration of tactile sensors 56 that are provided to give an offset is explained with reference to FIGS. 22, 23A, 23B and 23C. FIG. 22 is a top view showing a configuration of the tactile sensors 56 disposed on the seat surface 8a. FIGS. 23A, 23B and 23C are top views showing shifts of the riding position on the seat surface 8a. As shown in FIG. 22, a plurality of tactile sensors 56 are arrange in array on the seat surface 8a. The tactile sensors 56 have a resolution at such a level that they can detect the shape of buttocks 72 and thighs 73. That is, the tactile sensors 56 are arranged at such intervals that they can recognize the shape of buttocks and thighs. Then, the riding position is detected based on the distribution of tactile sensors 56 outputting touch signals. That is, a deviation amount from the normal riding position is detected. By using a plurality of tactile sensors 56 in this way, distribution information on the contact position can be obtained. Then, the riding position is estimated based on this distribution information.

For example, as shown in FIG. 23A, if the passenger sits in a forward-right area with respect to the normal riding position, the distribution information is changed. As a result, it is determined that the riding position is changed, and therefore an offset is given to each of the moments Mx and My. Further, as shown in FIG. 23B, if the passenger sits in a backward area with respect to the normal riding position, an offset is given to the moment My. Furthermore, as shown in FIG. 23C, if the passenger sits in a left area with respect to the normal riding position, an offset is given to the moment Mx. By giving offsets to measured moments in this manner, it is possible to operate the vehicle by using the same driving method as the driving method performed when the passenger sits in the normal riding position.

For example, the offset is updated every time a significant change occurs in the riding position. That is, the offset is reset to a different value at the timing when the deviation amount of the riding position exceeds the threshold. In this way, even when the passenger adjusts his/her sitting position and the riding position is thereby changed, the passenger can operate the vehicle in the same fashion. For example, when the passenger takes the neutral posture, the vehicle 1 stops moving. Further, when the passenger wants to move forward, the passenger takes a forward-inclined posture. In this way, the vehicle can move as the passenger intended, and therefore the operability can be improved.

Figure 24:
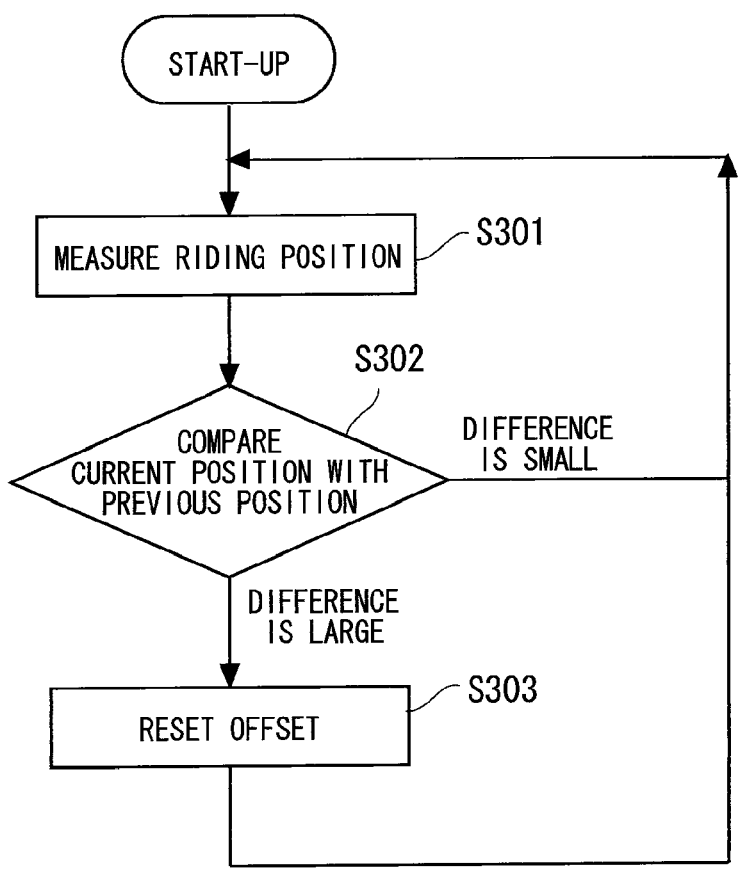
FIG. 24 is a flowchart showing a control method for a vehicle in accordance with an eighth exemplary embodiment.

Next, a control method for the vehicle 1 in accordance with this exemplary embodiment is explained with reference to FIG. 24. FIG. 24 is a flowchart showing a control method of the vehicle 1 in accordance with this exemplary embodiment. After starting up the vehicle 1, the riding position is measured by the riding position sensing unit 14 (step S301). Then, the riding position obtained in this measurement is compared with the riding position obtained in the previous measurement (step S302). When the difference between the riding position in the current measurement and the riding position in the previous measurement is greater than a threshold, the offset is reset to a different value (step S303). Then, the process returns to the step S301 in which the riding position is measured. Further, when the difference between the current riding position and the previous riding position is smaller than the threshold, the process returns to the step S301 in which the riding position is measured. Further, after the comparison in the step S302, the previous riding position is replaced by the current riding position. In this way, the resetting of the offset can be easily performed. The offset value can be determined based on the distribution information and/or the riding position. In this example, the processing is performed with the same offset value until the offset is updated. Further, reference inputs are calculated based on input moment values obtained from the same offset value. These reference inputs are output to the driving motors 603. For example, a relational formula or a table of offset values for distribution information or riding positions is established in advance. In this way, the offset value can be easily calculated.

Further, when omnidirectional wheels are used for the wheels 6, an offset may be also set to the moment Mz. That is, when the passenger is on the vehicle while facing a direction deviated from the exactly-forward direction around the yaw axis, an offset is set for the moment Mz. In this way, the operability can be improved. Note that this exemplary embodiment does not use the determination unit 12 and the posture sensing unit 4. Therefore, the determination unit 12 and the posture sensing unit 4 are not indispensable to the vehicle 1 in this exemplary embodiment.

Note that although the timing at which the offset is set is determined based on the change of the on-board weight and/or the riding position in the sixth and seventh exemplary embodiments, the timing at which the offset is set is not limited to these timings. The offset can be set based on an output from a sensor other than those sensors. Further, the offset may be set by combining the sixth and seventh exemplary embodiments.

Eighth Exemplary Embodiment

In the vehicle 1 shown in FIGS. 1 to 11, when the passenger 71 tries to accelerate the vehicle, the posture of the passenger 71 is significantly inclined forward. For example, when the passenger tries to move forward at a high speed, the passenger needs to bend forward extensively. As a result, depending on the posture of the passenger 71, the position of the center of gravity of the vehicle 1 including the passenger 71 could go out of the static stability area of the robot.

Figure 25:
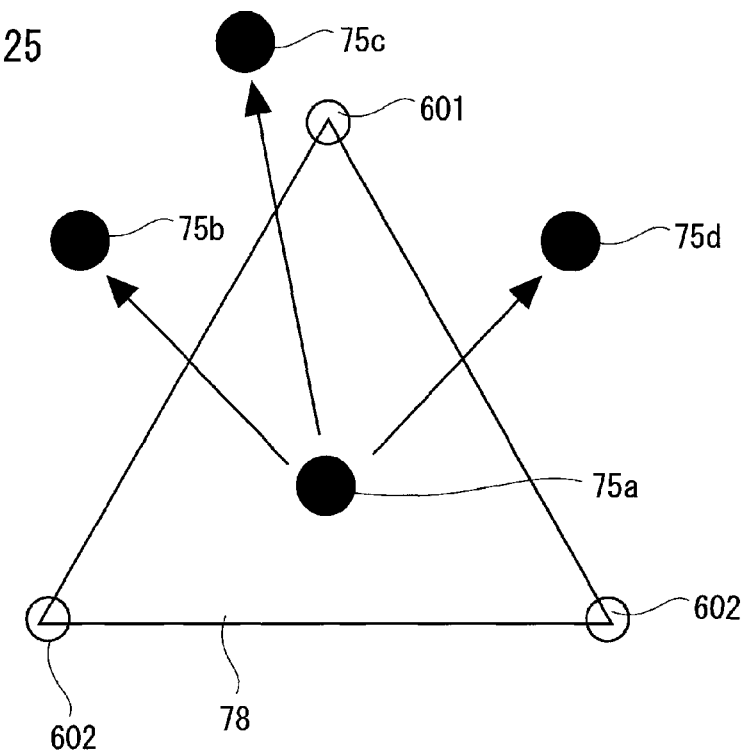
FIG. 25 is a top view showing a static stability area of a vehicle.

In this exemplary embodiment, a three-wheel type vehicle 1 is adopted as shown in FIGS. 1 and 2. Therefore, the static stability area 78 becomes a triangle as shown in FIG. 25. FIG. 25 is a top view showing the static stability area of the vehicle 1. One wheel 6 is disposed at each of the three vertices of the triangle. When the passenger tries to accelerate the vehicle, the position of the center of gravity goes out of the static stability area 78. For example, when the angle of the forward-inclined posture becomes too large, the position of the center of gravity 75b to 75d goes out of the static stability area 78. That is, the position of the center of gravity 75b to 75d is located outside the static stability area 78.

In such a situation, the vehicle 1 is in a very unstable state. For example, the vehicle 1 could tumble down, or the wheel 6 could come off the ground. Further, if the rear wheel 602, which is the driving wheel, comes off the ground, the vehicle cannot move in accordance with the passenger's intention. Therefore, in this exemplary embodiment, the vehicle is controlled according to measurement signals from the force sensor 9 so that the position of the center of gravity does not go out of the static stability area 78. Specifically, the roll axis mechanism and the pitch axis mechanism provided in the vehicle 1 are actively driven in order to prevent the position of the center of gravity going out of the static stability area 78.

In this exemplary embodiment, the roll axis mechanism and the pitch axis mechanism shown in FIG. 5 are adopted. The posture of the vehicle 1 is changed by driving the drive unit 5. Note that when the yaw-axis mechanism 501 is not driven, the provision of the yaw-axis mechanism 501 is not indispensable.

Figure 26:
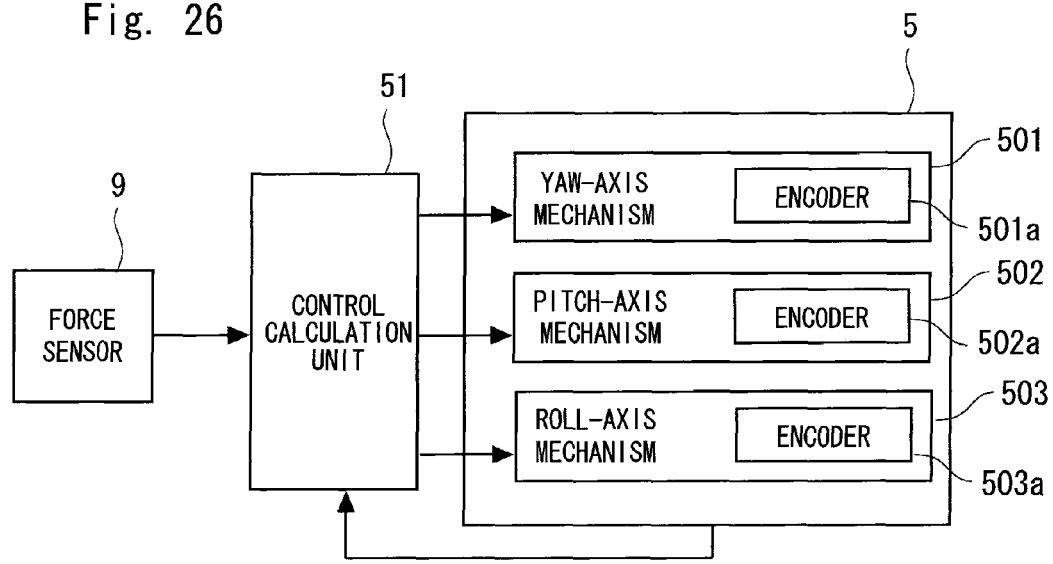
FIG. 26 is a block diagram showing a configuration a control system of a vehicle in accordance with an eighth exemplary embodiment.

Next, the control to drive the yaw-axis mechanism 501, pitch-axis mechanism 502, and roll-axis mechanism 503 is explained with reference to FIG. 26. FIG. 26 is a block diagram showing a configuration of a control system of the vehicle 1 in accordance with this exemplary embodiment. In this exemplary embodiment, the detection result of the force sensor 9 is used to drive each mechanism. That is, the control calculation unit 51 calculates target angles based on a detection result of the force sensor 9.

In this exemplary embodiment, the pitch-axis mechanism 502 and the roll-axis mechanism 503 are driven according to a force exerted on the force sensor 9. For example, assume that the force sensor 9 detects a moment My around the pitch axis and a moment Mx around the roll axis. Then, the control calculation unit 51 estimates the position of the center of gravity according to these moments Mx and My measured by the force sensor 9. Then, when the position of the center of gravity is likely to go out of the static stability area, the target angles of the pitch-axis mechanism 502 and the roll-axis mechanism 503 are calculated. As a result, the seat surface 8a rotates around the pitch axis and around the roll axis.

Specifically, it is determined whether the position of the center of gravity is likely to go out of the static stability area or not based on the moments Mx and My. When the position of the center of gravity is likely to go out of the static stability area, the pitch-axis mechanism 502 and the roll-axis mechanism 503 are driven in such directions that the moments Mx and My become larger. That is, the posture of the vehicle 1 is changed so that the input moment values Mx' and My' become larger. In this way, the traveling speed can be increased without having the passenger bend his/her posture extensively. Therefore, it is possible to prevent the position of the center of gravity from going out of the static stability area. For example, when the passenger bends to the forward-right direction, the vehicle 1 drives the pitch-axis mechanism 502 and the roll-axis mechanism 503 to incline the seat surface 8*a* in such a manner that the forward-right portion of the seat surface 8*a* moves upward and the backward-left portion moves downward. As a result, the moments Mx and My are increased and the traveling speed is thereby increased. Therefore, it is possible to prevent the tumbling-down of the vehicle 1 as well as the levitation of the wheels 6, thus enabling the vehicle to move with stability.

Figure 27:
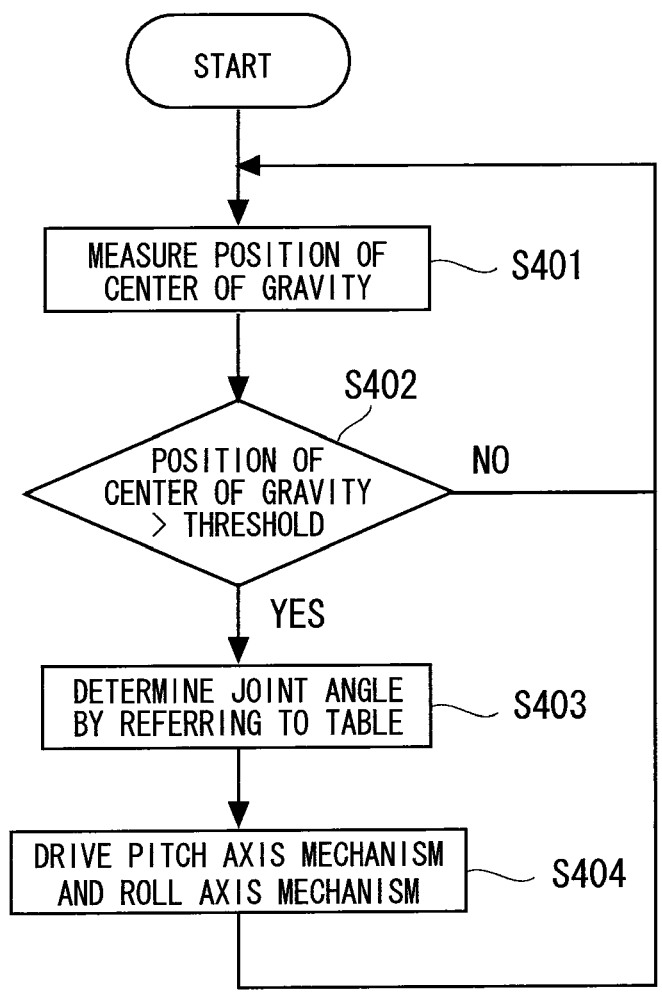
FIG. 27 is a flowchart showing a control method for a vehicle in accordance with an eighth exemplary embodiment.

A control method for the vehicle 1 in accordance with this exemplary embodiment is explained with reference to FIG. 27. FIG. 27 is a flowchart showing a control method of the vehicle 1 in accordance with this exemplary embodiment. Firstly, the force sensor 9 detects moments Mx and My to measure the position of the center of gravity (step S401). Then, it is determined whether the position of the center of gravity exceeds a threshold or not (step S402). When the position of the center of gravity does not exceed the threshold (No at step S402), it is determined that the position of the center of gravity is not likely to go out of the static stability area. As a result, the process returns to the step (step S401) in which the position of the center of gravity is measured.

On the other hand, when the position of the center of gravity exceeds the threshold (Yes at step S402), it is determined that the position of the center of gravity is likely to go out of the static stability area. As a result, the control calculation unit 51 determines the joint angles by referring to a table (step S403). That is, the rotation angles of the pitch-axis mechanism 502 and the roll-axis mechanism 503 are calculated. Note that this table is established in advance according to the weight of the vehicle 1 and its balance. For example, a table showing the relation between moments Mx and My and joint angles is established in advance. In this way, when moments Mx and My are determined, joint angles are also determined according to those moments. The target joint angles of the pitch-axis mechanism 502 and the roll-axis mechanism 503 are calculated. Alternatively, the target joint angles of the pitch-axis mechanism 502 and the roll-axis mechanism 503 may be calculated by using a control formula.

Then, the control calculation unit 51 outputs reference inputs to the pitch-axis mechanism 502 and the roll-axis mechanism 503 to drive the pitch-axis mechanism 502 and the roll-axis mechanism 503 (step S404). As a result, the moment Mx and My are increased and the traveling speed is thereby increased. Therefore, the vehicle is accelerated to a desired speed without having the passenger bend his/her posture further. As a result, the reduction of the risk of tumbling down and the speed-up can be achieved at the same time.

Note that although the determination whether the position of the center of gravity is likely to go out of the static stability area or not is made by using the moments Mx and My in the above explanation, the determination may be made according to the variations (differentiations with respect to time) of the moments Mx and My. Needless to say, the determination may be made according to both the moment values and the variations of the moments.

Note that although the posture of the vehicle 1 is controlled by inclining the seat surface 8*a* in the above explanation, this exemplary embodiment is not limited to this configuration. That is, the configuration to increase the moments is not limited to the pitch-axis mechanism 502 and the roll-axis mechanism 503. For example, the moments may be increased by driving the footrest 10. That is, a motor and a speed reducer may be provided in the footrest 10 so that the footrest 10 can be driven in the forward-and-backward direction or the up-and-down direction. Then, the footrest 10 capable of moving in the up-and-down direction or the forward-and-backward direction is driven according to the output from the force sensor 9. In this way, it is possible to achieve a similar advantageous effect to that achieved by inclining the seat surface 8*a*.

Figure 28:
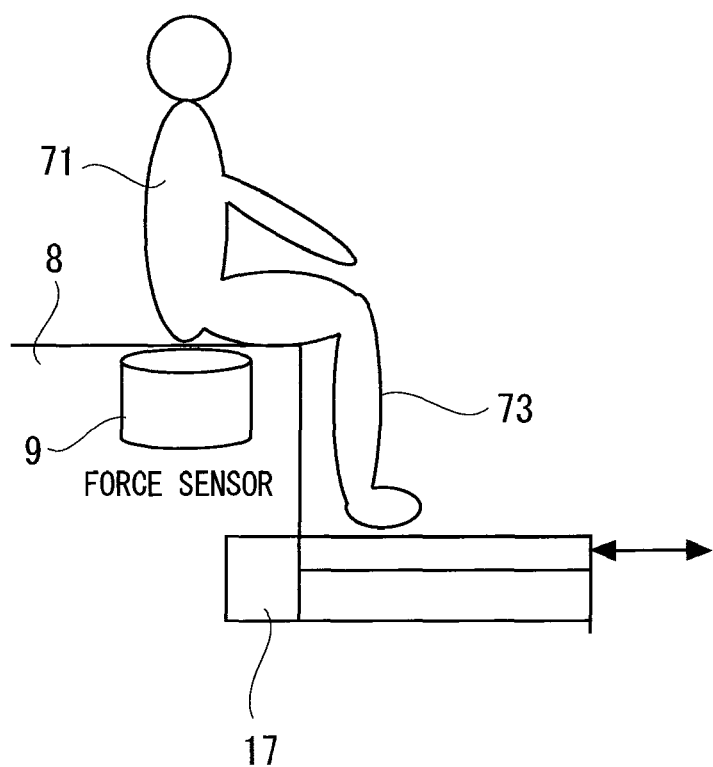
FIG. 28 is a side view showing a configuration of a footrest used in a vehicle in accordance with an eighth exemplary embodiment.

For example, a footrest drive unit 17 that drives the footrest 10 in the forward-and-backward direction is provided as shown in FIG. 28. The footrest drive unit 17 is composed of a motor, a speed reducer, and the like. The footrest drive unit 17 moves the upper part of the footrest 10, i.e., the surface on which the feet are placed in the forward-and-backward direction. By changing the position of the footrest 10, the knee angles of both legs are changed. The posture of the passenger is changed, and the force exerted on the force sensor 9 is thereby changed. In this process, the footrest 10 is moved to such a direction that the force exerted on the force sensor 9 is increased. As a result, the reduction of the risk of tumbling down and the speed-up can be achieved at the same time. Note that this exemplary embodiment does not use the determination unit 12, the riding position sensing unit 14, and the posture sensing unit 4. Therefore, the determination unit 12, the riding position sensing unit 14, and the posture sensing unit 4 are not indispensable to the vehicle 1 in this exemplary embodiment.

Ninth Exemplary Embodiment

In this exemplary embodiment, the coefficient adjustment or the offset is changed according to a detection result in the posture sensing unit 4 shown in FIG. 11. That is, the coefficient shown in the third exemplary embodiment or the offset shown in the fourth and sixth exemplary embodiments is changed based on the output from the posture sensing unit 4.

Figure 29:
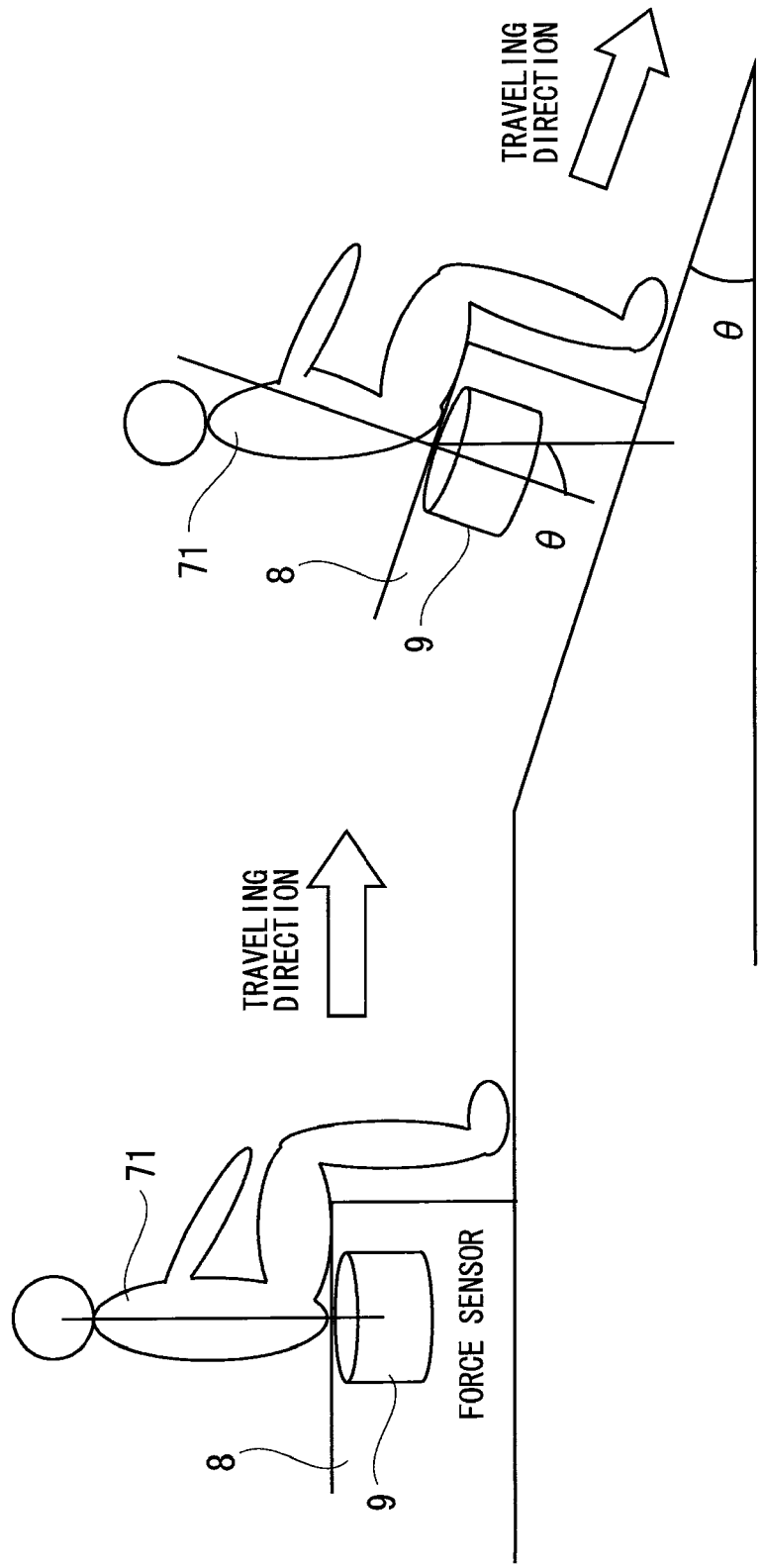
FIG. 29 is a side view showing an aspect of a vehicle moving on an inclined surface.

As shown in FIG. 29, when the vehicle 1 moves from a flat surface to an inclined surface, the input to the force sensor 9 is changed. In such a case, even when the passenger maintains the same posture, the traveling speed is changed. For example, when the vehicle moves on a downward slope, the riding surface is inclined forward. As a result, as shown in FIG. 29, the posture of the passenger 71 is inclined backward with respect to the riding surface, and therefore the force sensor 9 detects a backward movement input. Therefore, the vehicle cannot move down the downward slope. Further, when the vehicle moves on an upward slope, the riding surface is inclined backward. As a result, the passenger 71 bends forward with respect to the riding surface. Accordingly, the force sensor 9 detects a forward movement input larger than necessary, and therefore the vehicle cannot move up the upward slope in accordance with the passenger's intention. Further, if the vehicle moves in such a situation that the left or right side of the floor surface is raised, a turning input is detected. As a result, the vehicle turns left or right.

Figure 30:
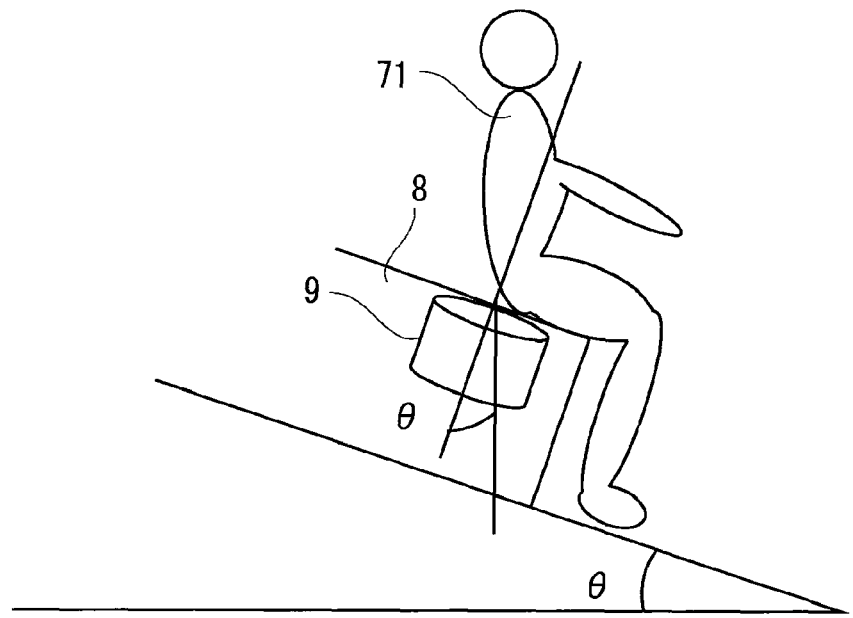
FIG. 30 is a diagram for explaining an aspect of a vehicle moving on an inclined surface when an offset is given to the vehicle.

Accordingly, in this exemplary embodiment the coefficient or the offset is optimized according to the output from the posture sensing unit 4 For example, a table showing the relation between posture angles detected by the posture sensing unit 4 and coefficients is established in advance. Alternatively, a table showing the relation between posture angles detected by the posture sensing unit 4 and offsets is established in advance. For example, as shown in FIG. 30, the reference position used in the input moment value calculation is shifted backward. An offset to given the moment My so that the yaw axis is shifted backward. An offset is given so that the input moment value is increased. The change of the input moment values Mx' and My' caused by the posture change of the vehicle 1 is reduced. Therefore, even when the vehicle is moving on an inclined surface, it is possible to operate the vehicle in the same fashion by the same operation as the vehicle is moving on a flat surface. As a result, the operability can be improved.

Needless to say, this exemplary embodiment is not limited to the configurations in which the offset setting is changed. For example, the coefficient may be adjusted according to the posture change. That is, the relation between the input moment values and the moments may be changed according to the posture angle of the chassis 13 detected by the posture sensing unit 4.

Figure 31:
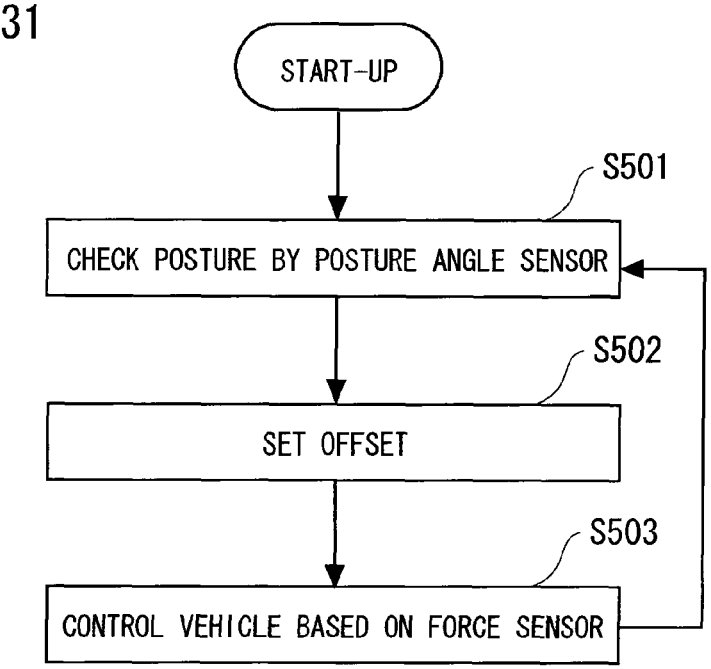
FIG. 31 is a flowchart showing a control method of a vehicle in accordance with a ninth exemplary embodiment.

Next, a control method for the vehicle 1 in accordance with this exemplary embodiment is explained with reference to FIG. 31. FIG. 31 is a flowchart showing a control method of the vehicle 1 in accordance with this exemplary embodiment. Firstly, when the vehicle 1 is driven, the posture is checked by the posture sensing unit 4 (step S501). That is, a posture angle around each axis is measured. Then, an offset is set according to the measured inclination angle of the vehicle 1 (step S502). The offset is determined by using a table showing relation between posture angles and offset values or a relational formula to calculate an offset from a posture angle. Needless to say, the coefficient adjustment may be performed instead of or in addition to the offset setting.

Then, the vehicle control is performed based on the force sensor (step S503). At this point, the offset has been changed according to the posture angle. Since the offset has been optimized, the position of the origin of the input moment values is changed. In this way, the vehicle 1 moves on the inclined surface with the normal operation for the passenger. It is possible to move the vehicle as the passenger intended, and therefore the operability can be improved. The vehicle 1 in accordance with the third exemplary embodiment does not use the determination unit 12 and the riding position sensing unit 14. Therefore, the provision of them is not indispensable in this exemplary embodiment.

Further, the present invention is not limited to the wheel-type vehicle 1, and is also applicable to walking-type vehicles. That is, the present invention can be applied to any vehicle equipped with a traveling mechanism to move the main body such as the chassis 13 with respect to the floor surface.

Further, two or more of the exemplary embodiments can be combined with each other as appropriate. For example, the first and second exemplary embodiments may be combined, so that when the vehicle is moving on a flat surface, the control is performed in accordance with the first exemplary embodiment, whereas when the vehicle is moving on an inclined surface, the control is performed in accordance with the second exemplary embodiment. The determination whether the surface is flat or inclined may be made by the posture sensing unit 4. Further, for example, the first and third exemplary embodiments may be combined, so that the vehicle can move more accurately in accordance with the passenger's intention and the operability can be improved even further.

So far, the present invention has been explained with reference to exemplary embodiments. However, the present invention is not limited to the above-described exemplary embodiments. Various modifications can be made to the configuration and the details of the present invention by those skilled in the art without departing from the scope of the present invention.

This application is based upon and claims the benefit of priorities from Japanese patent application No. 2008-234560, filed on Sep. 12, 2008 and Japanese patent application No. 2008-233592, filed on Sep. 11, 2008, the disclosures of which are incorporated herein in their entirety by reference.

INDUSTRIAL APPLICABILITY

The present invention can be widely applied to vehicles that move with a passenger riding thereon.

REFERENCE SIGNS LIST

1 VEHICLE
2 FRAME UNIT
3 RIDING PORTION
4 POSTURE SENSING UNIT
5 DROVE UNIT
501 YAW-AXIS MECHANISM
501a ENCODER
502 PITCH-AXIS MECHANISM
502a ENCODER
503 ROLL-AXIS MECHANISM
503a ENCODER
603 DRIVING MOTOR
603a ENCODER
6 WHEEL
601 FRONT WHEEL
602 REAR WHEEL
603 DRIVING MOTOR
603a ENCODER
7 PASSENGER SEAT
8a SEAT SURFACE
9 FORCE SENSOR
10 FOOTREST
11 HOUSING
12 DETERMINATION UNIT
13 CHASSIS
14 RIDING POSITION SENSING UNIT
17 FOOTREST DRIVE UNIT
51 CONTROL CALCULATION UNIT
52 BATTERY
53 SENSOR PROCESSING UNIT
71 PASSENGER
72 BUTTOCK
73 THIGH
75 POSITION OF CENTER OF GRAVITY
76 BAGGAGE
77 SWITCH
78 STATIC STABILITY AREA
201 FIRST PARALLEL LINKAGE
201a HORIZONTAL LINK
201b VERTICAL LINK
202 SECOND PARALLEL LINKAGE
202a HORIZONTAL LINK
202b VERTICAL LINK
301 SUPPORT SHAFT

The invention claimed is:
1. A vehicle comprising:
a passenger seat on which a passenger rides on;
a main body that support the passenger seat;
a traveling mechanism that moves the main body;
a sensor that detects weight shift of the passenger when the passenger shifts his/her weight to input a direction the passenger wants to move, and outputs a measurement signal indicating a plurality of moments according to a force exerted on a seat of the passenger seat;

a passenger-seat drive mechanism that drives the passenger seat so as to change an angle of the seat surface of the passenger seat; and a control calculation unit that calculates a reference input used to drive the traveling mechanism and the passenger-seat drive mechanism based on a drive amount of the passenger-seat drive mechanism, a balanced position posture of the passenger seat, and the measurement signal from the sensor.

2. The vehicle according to claim 1, further comprising a posture sensing unit that outputs a signal according to a posture angle of the vehicle, wherein the balanced position posture of the passenger seat is changed according to an output of the posture sensing unit.

3. The vehicle according to claim 2, wherein the balance position posture of the passenger seat is changed so that a riding surface of the passenger seat becomes horizontal.

4. The vehicle according to claim 1, wherein the balance position posture of the passenger seat is unchanged irrespective of a traveling state of the vehicle.

5. The vehicle according to claim 1, wherein a target drive amount of the passenger-seat drive mechanism is calculated based on the drive amount of the passenger-seat drive mechanism, the balanced position posture of the passenger seat, and the measurement signal from the sensor, and a forward/backward movement speed of the vehicle is calculated based on the target drive amount of the passenger-seat drive mechanism.

6. The vehicle according to claim 1, wherein the traveling mechanism comprises a first wheel, and the vehicle further comprises a second wheel, the second wheel arranged so as to be located apart from the first wheel in a forward/backward direction.

7. The vehicle according to claim 1, wherein the sensor outputs a plurality of moments according to a force exerted on a seat surface of the passenger seat;

wherein the control calculation unit calculates a reference input used to drive the traveling mechanism and the passenger-seat drive mechanism based on a drive amount of the passenger-seat drive mechanism, a balanced position posture of the passenger seat, and the plurality of moments from the sensor;

wherein the control calculation unit is programmed to convert the plurality of moments into corresponding input moment values; and wherein, for one of the plurality of moments, an absolute value of a corresponding input moment value is calculated to be larger when the one of the plurality of moments is positive as compared to when it is negative.

8. The vehicle according to claim 1, wherein the sensor outputs the plurality of moments according to a force exerted on a seat surface of the passenger seat;

wherein the sensor further measures an on-board weight of the passenger seat; and wherein the control calculation unit applies offset values to the plurality of moments according to the on-board weight of the passenger seat; wherein the control calculation unit further calculates a reference input used to drive the traveling mechanism and the passenger-seat drive mechanism based on a drive amount of the passenger-seat drive mechanism, a balanced position posture of the passenger seat, and the plurality of moments from the sensor.

9. The vehicle according to claim 1, further comprising a plurality of tactile sensors disposed on the passenger seat that output touch signals according to a seating position of the passenger on the passenger seat;

wherein the sensor is a force sensor that outputs a plurality of moments according to a force exerted on a seat surface of the passenger seat; and wherein the control calculation unit applies offset values to the plurality of moments according to the touch signals of the tactile sensors; wherein the control calculation unit further calculates a reference input used to drive the traveling mechanism and the passenger-seat drive mechanism based on a drive amount of the passenger-seat drive mechanism, a balanced position posture of the passenger seat, and the plurality of moments from the force sensor.

10. A control method for a vehicle, the vehicle comprising:

a passenger seat on which a passenger rides on;

a main body that support the passenger seat;

a traveling mechanism that moves the main body;

a sensor that detects weight shift of the passenger when the passenger shifts his/her weight to input a direction the passenger wants to move and outputs a measurement signal indicating a plurality of moments according to a force exerted on a seat of the passenger seat; and a passenger-seat drive mechanism that drives the passenger seat so as to change an angle of the seat surface of the passenger seat, the control method comprising:

a step of inputting a balanced position posture of the passenger seat; and a step of calculating a reference input used to drive the traveling mechanism and the passenger-seat drive mechanism based on the measurement signal from the sensor, the balanced position posture, and a drive amount of the passenger-seat drive mechanism.

11. The control method for a vehicle according to claim 10, wherein a signal according to a posture angle of the vehicle is output by a posture sensing unit provided in the vehicle, and the balanced position posture of the passenger seat is changed according to an output of the posture sensing unit.

12. The control method for a vehicle according to claim 11, wherein the balance position posture of the passenger seat is changed so that a riding surface of the passenger seat becomes horizontal.

13. The control method for a vehicle according to claim 12, wherein the balance position posture of the passenger seat is unchanged irrespective of a traveling state of the vehicle.

14. The control method for a vehicle according to claim 10, wherein a target drive amount of the passenger-seat drive mechanism is calculated based on the drive amount of the passenger-seat drive mechanism, the balanced position posture of the passenger seat, and the measurement signal from the sensor, and a forward/backward movement speed of the vehicle is calculated based on the target drive amount of the passenger-seat drive mechanism.

15. The control method for a vehicle according to claim 10, wherein the traveling mechanism comprises a first wheel, and the vehicle further comprises a second wheel, the second wheel arranged so as to be located apart from the first wheel in a forward/backward direction.

16. The control method for a vehicle according to claim 10, wherein the sensor outputs a plurality of moments according to a force exerted on a seat surface of the passenger seat and the control calculation unit calculates a reference input used to drive the traveling mechanism and the passenger-seat drive mechanism based on a drive amount of the passenger-seat drive mechanism, a balanced position posture of the passenger seat, and the plurality of moments from the sensor, further comprising:
- a step of converting the plurality of moments into corresponding input moment values,
- wherein, for one of the plurality of moments, an absolute value of a corresponding input moment value is calculated to be larger when the one of the plurality of moments is positive as compared to when it is negative.

* * * * *